United States Patent [19]

Yamazaki et al.

[11] Patent Number: 5,337,348

[45] Date of Patent: * Aug. 9, 1994

[54] MODEM POOLING SYSTEM FOR COMMUNICATING BETWEEN A TELEPHONE AND A PLURALITY OF DATA TERMINALS

[75] Inventors: Yuichi Yamazaki, Hachioji; Hideyasu Mori; Hiroshi Mano, both of Hino; Norimitsu Ikehata, Sagamihara; Takashi Aoki, Akishima; Yoshikazu Sano, Hino, all of Japan

[73] Assignee: Kabushiki Kaisha Toshiba, Kawasaki, Japan

[*] Notice: The portion of the term of this patent subsequent to Jun. 7, 2011 has been disclaimed.

[21] Appl. No.: 716,802

[22] Filed: Jun. 19, 1991

[30] Foreign Application Priority Data

Jun. 19, 1990 [JP] Japan .................................. 2-160593

[51] Int. Cl.⁵ ............................................. H04M 11/00
[52] U.S. Cl. ........................................ 379/94; 375/121
[58] Field of Search ........................... 379/93, 97–99, 379/441–443, 156, 164, 165, 212, 94; 375/8, 121

[56] References Cited

FOREIGN PATENT DOCUMENTS

0147160A1 12/1984 European Pat. Off. .
0262859A1 9/1987 European Pat. Off. .

OTHER PUBLICATIONS

W. Chabrie, W. Maier, Hans-Manfred Niedetsky; das Multikommunikations-Terminal TX 90. Tlenorma-Nachrichten, 1989, vol. 7. 93, pp. 3–10.
G. Ruoppe, Die Anpassung herkommlicher Endgerate an das ISDN, Frequens 42 (1988) vol. 2/3, pp. 51–59.

Primary Examiner—Wing F. Chan
Attorney, Agent, or Firm—Foley & Lardner

[57] ABSTRACT

In a key telephone system in which a plurality of data terminals 37*l* . . . 37*n* such as personal computers are connected to a key service unit 1 connected to a plurality of telephone lines 25*l* . . . 25*m*, a modem 43 is pooled so as to be usable in common for the plural data terminals 37*l* . . . 37*n*. In response to a called party number signal from the telephone lines (e.g. 25*l*) in dial-in service, the key service unit 1 selects a single data terminal designated by an extension telephone designation signal in dial-in service from among the data terminals 37*l* . . . 37*n*, and closes a communication channel between the selected data terminal (e.g. 37*l*) and the modem 43, so that a status equivalent to that where the selected data terminal 37*l* and the modem 43 are directly connected to each other can be established. Thereafter, the key service unit 1 indicates a called party number signal reception to the modem 43, and the modem 43 transmits a call to the selected data terminal 37*l*. When the selected data terminal 37*l* responds to the call from this modem 43, the key service unit 1 closes a communication channel between the modem 43 and the telephone line 25*l*, so that a communication link between the selected data terminal 37*l* and the telephone line 25*l* can be established via the modem 43. During the process until this communication link can be established, since the selected data terminal 37*l* and the modem 43 are in the status equivalent to direct coupling, the key service unit 1 is not concerned in the communications between the selected data terminal 37*l* and thus modem 43, thus reducing the operational load applied to the key service unit 1.

19 Claims, 20 Drawing Sheets

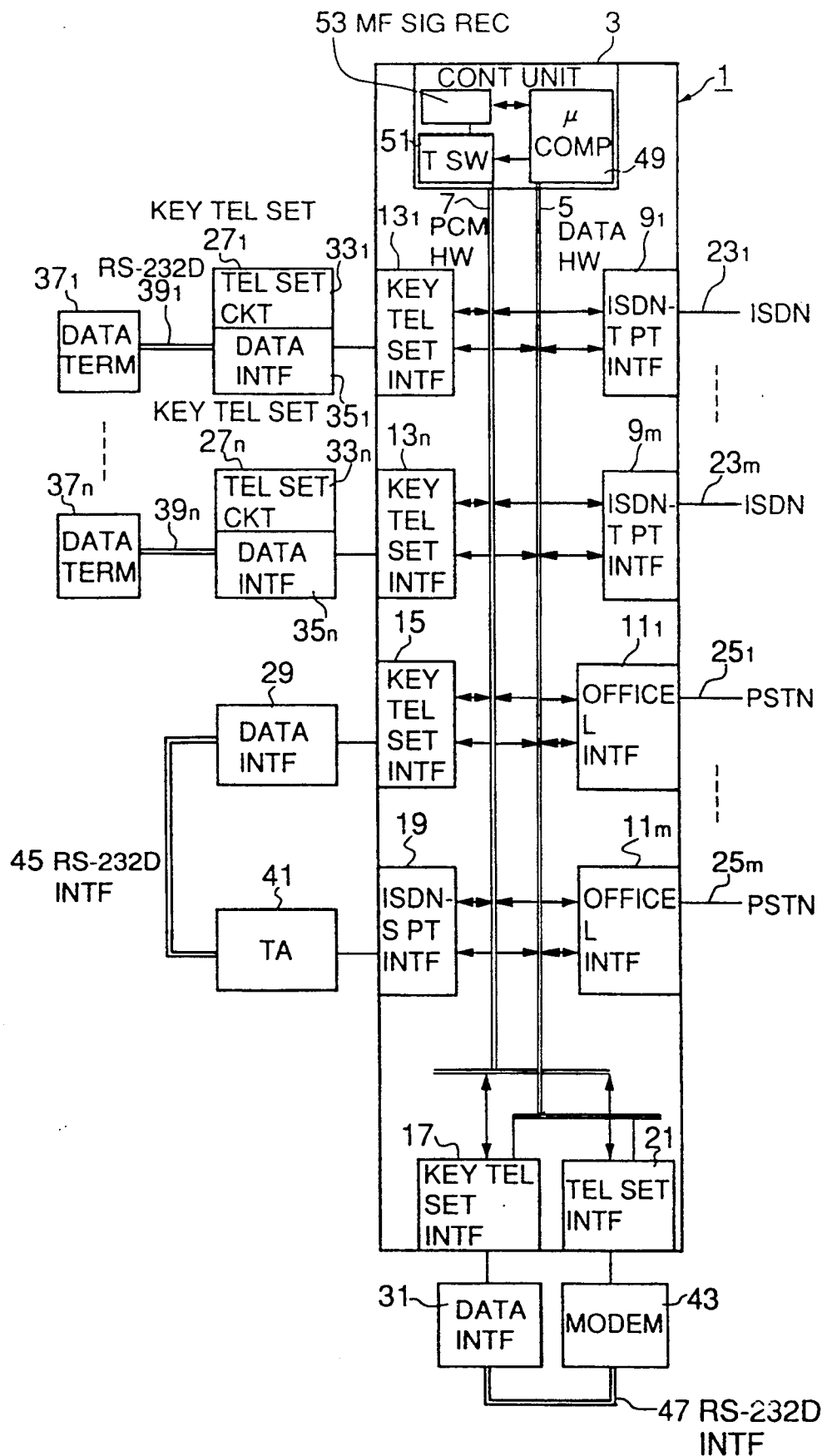
F I G . 1

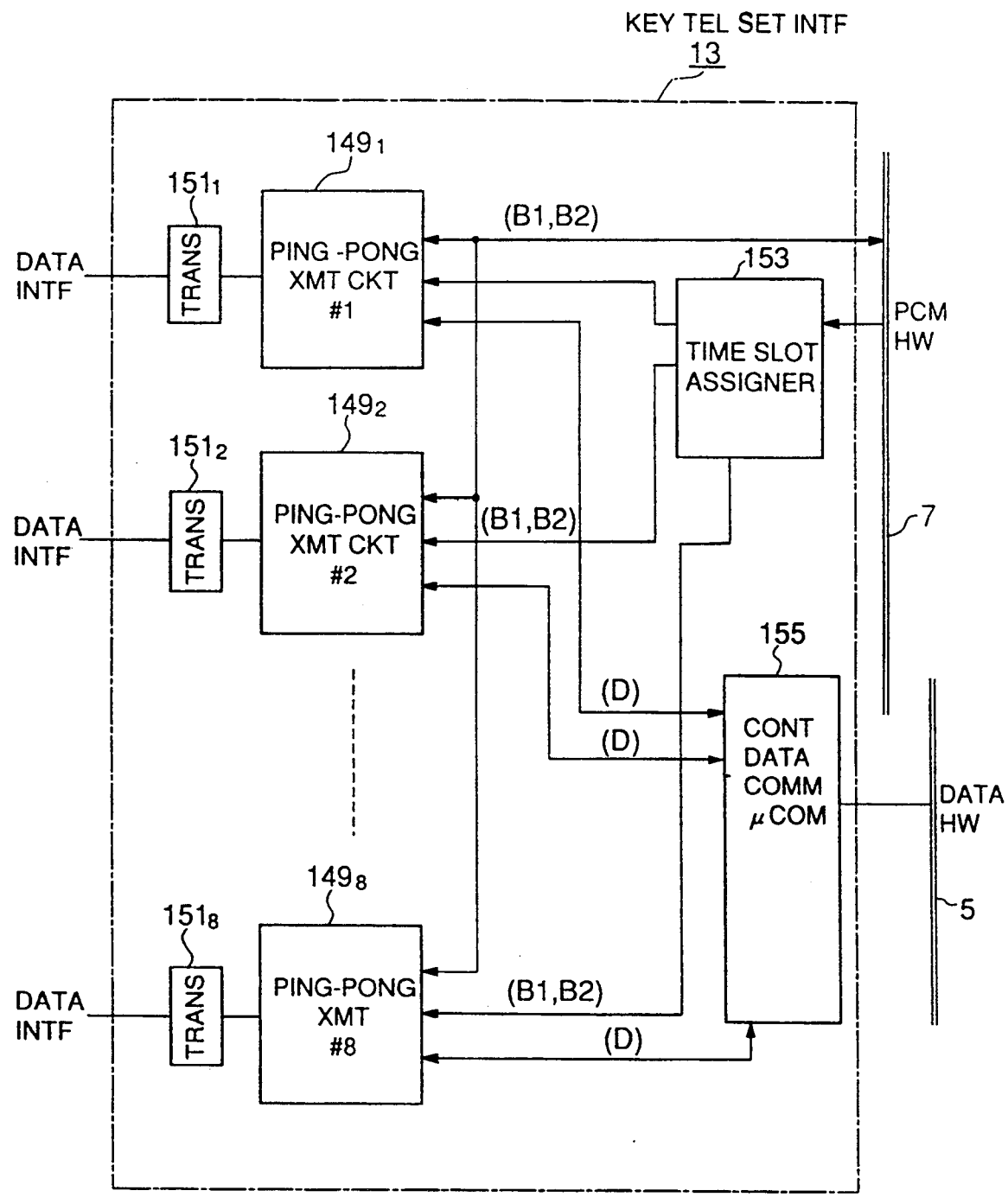
DKU BLOCK DIAGRAM
F I G . 7

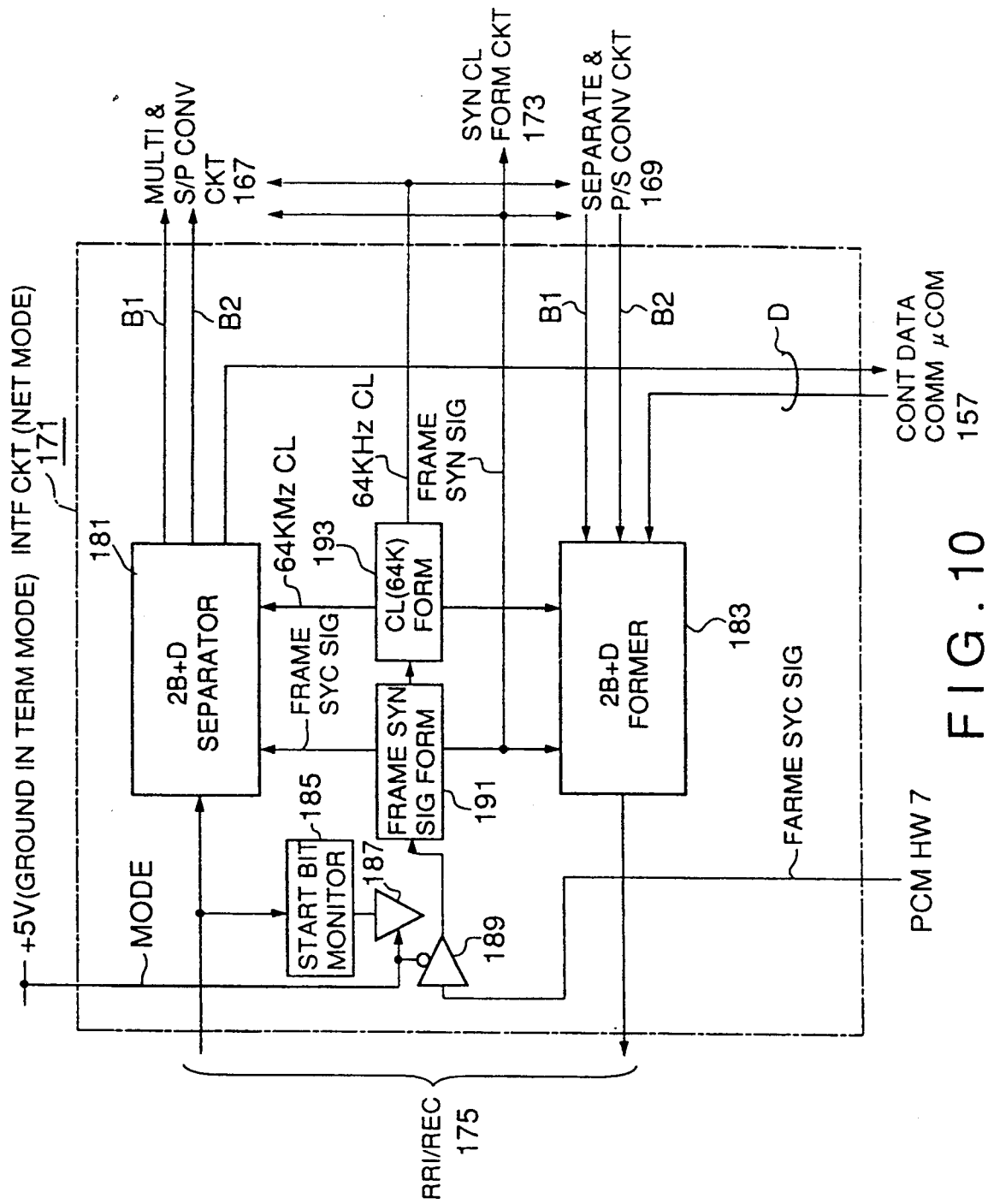
F I G. 10

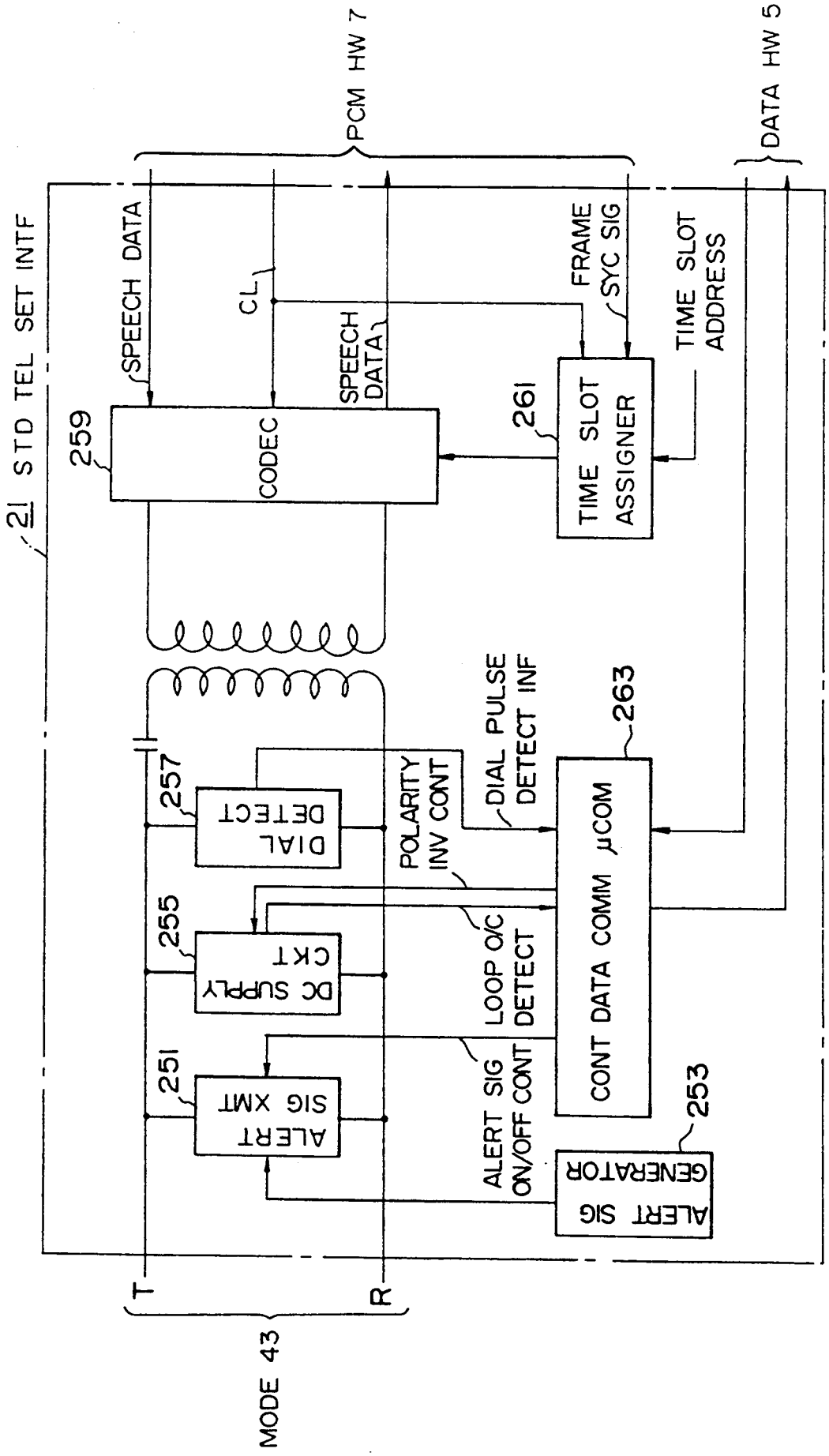
F I G. 13

MODEM POOLING SYSTEM FOR COMMUNICATING BETWEEN A TELEPHONE AND A PLURALITY OF DATA TERMINALS

BACKGROUND OF THE INVENTION

The present invention relates to a modem pooling system for pooling a modem so that the modem is usable in common for a plurality of data terminals, where the modem modulates and demodulates communication data to enable communications between the data terminals and a public subscriber telephone network (PSTN).

In a key telephone system or a PBX (private branch-exchange), a modem for modulating and demodulating data is provided to enable communications between data terminals connected to extension telephone sets and the PSTN. In this case, since it is not economical to provide a relatively high-costly modem for each data terminal, a single or several modems are pooled, and the pooled modem is selectively connected to the data terminal only when the data terminal is required to communicate with the PSTN. In this specification, the above-mentioned system is referred to as a modem pooling system. In the system, conventionally, when a calling party number signal is transmitted from the data terminal or a called party number signal from the PSTN is received by the data terminal, a central control unit for controlling the call processing and the exchange operation transmits or receives control commands between the modem and the data terminal via the RS-232D interface, respectively, analyzes transmit/receive data to/from the RS-232D, and controls various call processing such as modem mode control, data terminal alerting, communication channel connection between the modem and the data terminal, etc. on the basis of the analyzed results. In parallel to the above processing, additionally, the communication channel connection between the modem and the PSTN is controlled. In this case, the modem automatically receives a called party number signal and transmits a calling party number signal in accordance with the procedure prescribed by V. 25 bis of CCITT Recommendation. In the above automatic operation, it is also required to finely control the sequence or the timing of the communication channel connection, for prevention of data emission.

In the conventional modem pooling system, since the processing executed by the central control unit at the calling party number signal transmission or the called party number signal reception is complicated, there exists a problem in that a large load is applied to the central control unit.

SUMMARY OF THE INVENTION

With these problems in mind, therefore, it is the object of the present invention to provide a modem pooling system which can reduce load applied to the central control unit at the calling party number signal transmission and the called party number signal reception.

To achieve the above-mentioned object, the present invention provides a modem pooling system in which a modem is pooled to enable communications between a PSTN and a plurality of data terminals respectively, comprising: switching means for opening/closing a communication channel between the PSTN and the modem and a communication channel between each of the plural data terminals and the modem; terminal selecting means for selecting a data terminal from the plural data terminals in accordance with an extension telephone designation signal given by the PSTN in dial-in service and in response to a called party number signal transmitted from the PSTN; exchange control means for closing a communication channel between the selected data terminal and the modem by controlling said switching means in response to the called party number signal, to establish a status equivalent to that where the selected data terminal is directly coupled to the modem; and call control means for indicating a called party number signal reception from the PSTN to the modem to allow the modem to return a call signal to the selected data terminal, after the communication channel between the selected data terminal and the modem has been closed.

BRIEF DESCRIPTION OF THE DRAWINGS

FIG. 1 is a system block diagram showing an embodiment of the TA pooling system related to the present invention;

FIG. 7 is a block diagram showing a digital telephone set interface unit 13 shown in FIG. 1;

FIG. 10 is a block diagram showing an interface circuit 171 shown in FIG. 8;

FIG. 13 is a block diagram showing a standard telephone set interface unit 21 shown in FIG. 1;

DETAILED DESCRIPTION OF THE PREFERRED EMBODIMENTS

Figure 2:
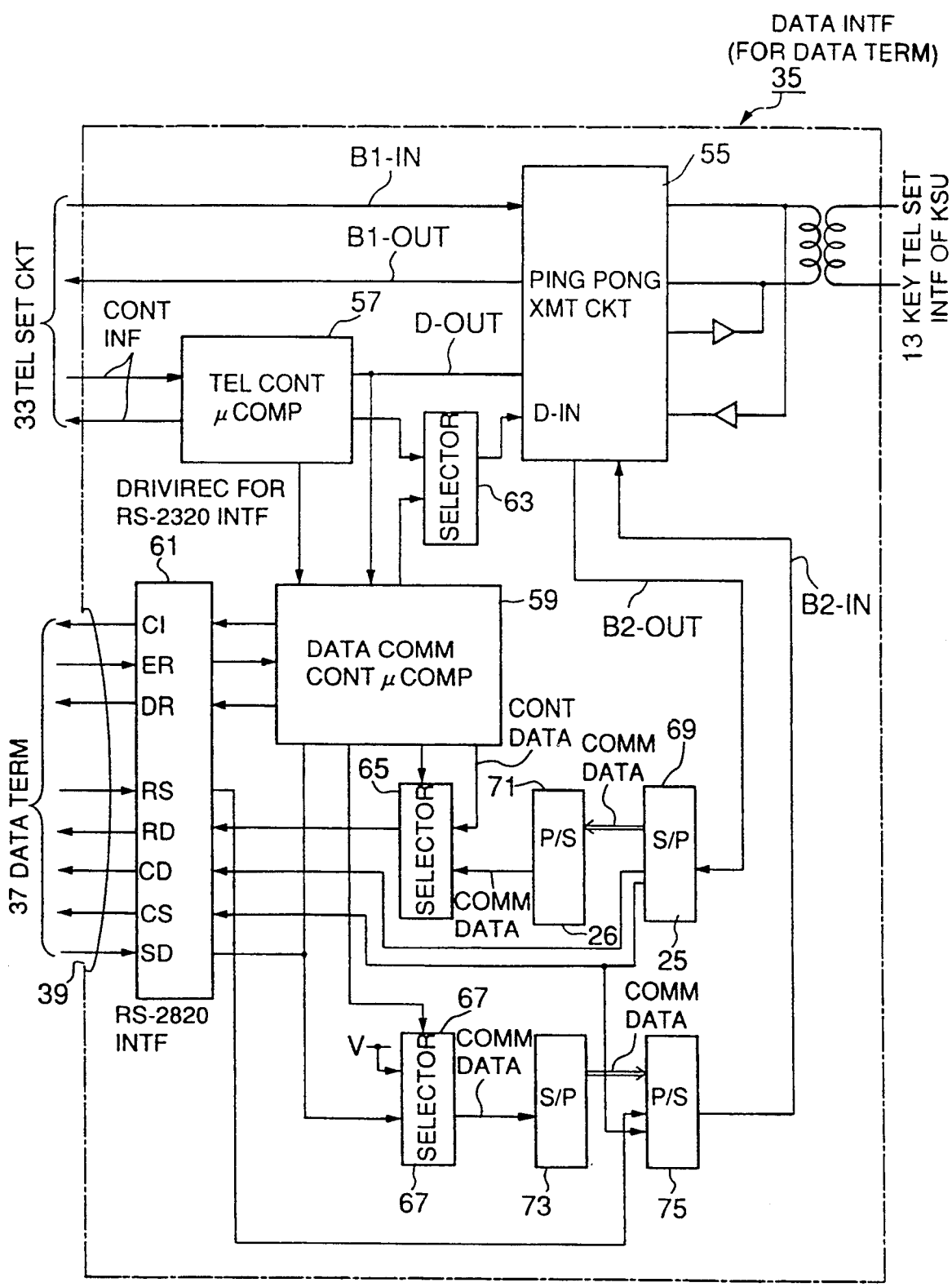
FIG. 2 is a block diagram showing a data interface unit 35 incorporated in a digital telephone set of the embodiment shown in FIG. 1.

FIG. 1 shows the system configuration of an embodiment of the modem pooling system according to the present invention, in which the system is configured as a digital key telephone system as a whole.

A key service (central) unit 1 comprises a control unit 3 for mainly control call processing and speed channel exchange operation, a data highway 5 serving as a control data transmission channel, a PCM highway serving as a time division speech channel, and various interface units 9, 11, 13, 15, 17 and 19. In practice, these interface units are ISDN-T point interface units $9_1$ to $9_m$ for connecting ISDNs $23_1$ to $23_m$ as office lines, office line interface units $11_1$ to $11_m$ for connecting PSTNs (public subscriber telephone network) (analog network) $25_1$ to $25_m$ as office lines, digital telephone set interface units $13_1$ to $13_n$, 15 and 17 for connecting digital telephone sets $27_1$ to $27_n$ as extension telephone sets and data interface units 29 and 30, an ISDN-S point interface unit 19 for connecting an ISDN terminal as an extension telephone set, and a standard telephone set interface unit 21 for connecting a standard telephone set as an extension telephone set.

The digital telephone sets $27_1$ to $27_n$ are connected to the digital telephone set interface units $13_1$ to $13_n$ of the key service unit 1. The digital telephone set 27 includes a telephone set circuit 33 provided with a function to internally A/D or D/A converting speech signals transmitted/received between the digital telephone set 27 and the key service unit 1 in the form of digital signals and a data interface unit 35 for transiting digital signal communications between the telephone set circuit 33 and the key service unit 1. This data interface unit 35 connected to a data terminal 37 having a RS-232D interface is provided with such a function as to convert transmit data (SD) and receive data (RD) of the RS-232D transmitted/received between the data interface unit 35 and the data terminal 37 into a data format communicatable between the interface unit 35 and the key service unit 1.

In this embodiment, a single terminal adapter (TA) 41 and a single modem 43 are pooled together.

The TA 41 is an apparatus-for converting the transmit data (SD) and the receive data (RD) of the RS-232D into a format of CCITT Recommendation V. 110 so that the data terminal 37 including the RS-232D interface can communicate with the ISDN 23. An ISDN connecting terminal of this TA 41 is connected to the ISDN-S point interface unit 19 of the key service unit 1, and a data apparatus connecting terminal is connected to the digital telephone set interface unit 15 of the key service unit via the data interface unit 29. Further, the data interface unit 29 interposed between the TA 41 and the digital telephone set interface unit 15 is provided with functions roughly similar to those of the data interface unit 35 in the digital telephone set 27 except the detailed functions. That is, the data interface unit 29 is provided with the function to convert transmit data (SD) and receive data (RD) of the RS-232D transmitted/received between the data interface unit 29 and the TA 41 into a data format communicatable between the interface unit 29 and the digital telephone set interface unit 15.

A modem 43 modulates and demodulates data so that the data terminal 37 having the RS-232D interface is communicatable with the PSTN 25. This modem 43 is provided with a network control unit (NCU) for transmitting a calling party number signal and receiving a called party number signal to and from the data terminal on the basis of the transmit data (SD) and the receive data (RD) of the RS-232D. A PSTN connecting terminal of this modem 43 is connected to a standard telephone set interface unit 21 of the key service unit 1; on the other hand, a data terminal connecting terminal is connected to a digital telephone set interface unit 17 of the key service unit 1 via the data interface unit 31. Further, the data interface unit 31 disposed between this modem 43 and the digital telephone set interface unit 17 is the same in function as the data interface unit 29 disposed between the TA 41 and the digital telephone set interface unit 15.

A control unit 3 of the key service unit 2 includes a microcomputer 49 for controlling the overall calls of the key service unit 1, a time switch circuit 51 for exchanging speech or data by mutually connecting time division speech channels under control of this microcomputer 49, and an dial tone multi-frequency (MF) signal receiver 53 for detecting MF signals (selection signals mixed with two different frequency signals) transmitted from an extension (individual) telephone set (not shown in this embodiment) or an office line and gives the detected results to the microcomputer 49.

In this system, where the data terminal 37 communicates data with the outside via the ISDN 23, a communication channel is formed under control of the microcomputer 49 by way of the ISDN 23, ISDN-T point interface unit 9, PCM highway 7, ISDN-S point interface unit 19, TA 41, RS-232D interface 45, data interface unit 29, digital telephone set interface unit 15, PCM highway 7, digital telephone set interface unit 13, data interface unit 35, RS-232D interface 39, and data terminal 37. On the other hand, where the data terminal 37 communicates data with the outside via the PSTN 25, a communication channel is formed by way of the PSTN 25, office line interface unit 11, PCM highway 7, standard telephone set interface unit 21, modem 43, RS-232D interface 47, data interface unit 31, digital telephone set interface unit 17, PCM highway 7, digital telephone set interface unit 13, data interface unit 35, RS-232D interface 39, and data terminal 37.

The major feature of this system is the procedure of how to form the above-mentioned communication channel at a called party number signal reception from the ISDN 23 or the PSTN 25.

The configuration of each of the sections of the system will be described in further detail hereinbelow.

FIG. 2 shows a configuration of the data interface unit 35 incorporated in the digital telephone set 27. The data interface unit 35 includes a ping-pong transmission circuit 55 for half-duplex communicating digital signals with the digital telephone set interface unit 13 of the key service unit 1 through two wires, a telephone control microcomputer 57 for controlling the telephone set circuit 33, a data communication control microcomputer 59 for controlling the data terminal 37, an RS-232D interface driver/receiver 61 for converting various signal levels communicatable with the data terminal 37 via the RS-232D interface 39, etc.

Figure 3:
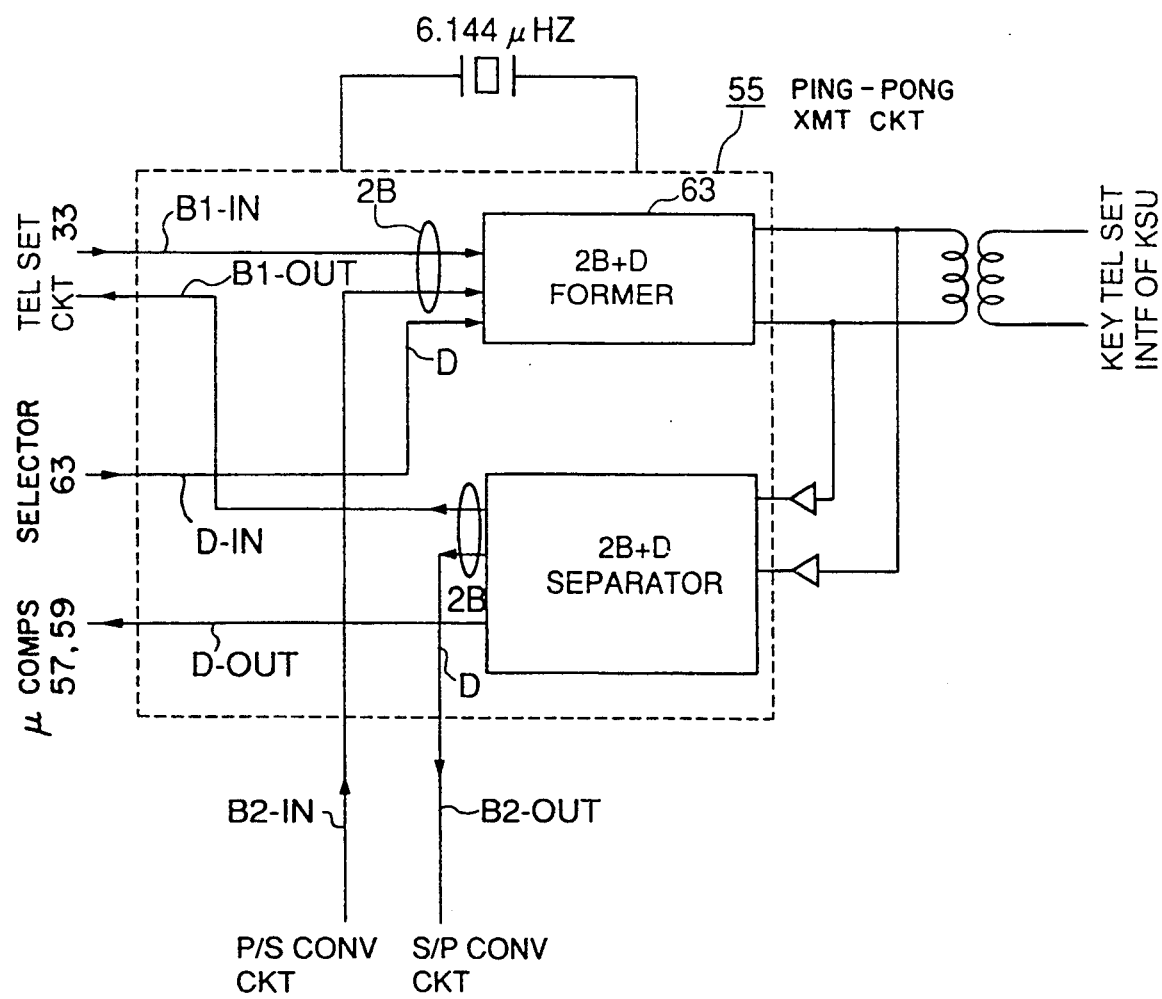
FIG. 3 is a block diagram showing a ping-pong transmission circuit shown in FIG. 2.

The ping-pong transmission circuit 55 transmits digital signals reciprocally between the circuit 55 and the key service unit via a time division channel of 2B+D formation composed of two B-channels (B1 and B2 channels) with a speed of 64 Kps and a D-channel with a speed of 16 Kps. As shown in FIG. 3, the ping-pong transmit circuit 49 includes a 2B+D forming circuit 65 for receiving an up-stream data for each channel, synthesizing these data into a data packet of 2B+D form, and transmitting it to the key service unit 1, and a 2B+D separating circuit 67 for receiving a downstream data packet of 2B+D form from the key service unit 1 and separating it into data for each channel. Here, the B1 channel is assigned to the transmission of speech data received and transmitted by the telephone circuit 33 during speech of the telephone set; the B2 channel is assigned to the transmission of communication data received and transmitted by the data terminal 37 during data communications thereof; and the D-channel is assigned to the transmission of control data received and transmitted by the telephone control microcomputer 57 and the data communication control microcomputer 59. Namely, speech data transmitted from the telephone set circuit 33 during speech are given as B1 channel up-stream data B1-IN; communication data transmitted from the data terminal 37 during data communication are given as B2 channel up-stream data B2-IN; control data outputted from the microcomputers 57 and 59 are given as D-channel up-stream data D-IN to the 2B+D forming circuit 63, respectively to form a data packet of 2B+D form, and then transmitted to the key service unit 1. Further, a 2B+D data packet given from the key service unit 1 to the 2B+D separating circuit 65 is separated thereby to B1 channel down-stream data B1-out, B2 channel down-stream data B2-out, and D-channel down-stream data D-OUT, respectively and then transmitted to the telephone set circuit 33, the data terminal 37 and the microcomputers 57 and 59, separately.

Each of the B2 channel down-stream and up-stream data B2-out and B2-IN is a 8-bit serial data (64 Kps), in which 6 bits represent a communication data (48 Kbps). Further, the two remaining bits of the down-stream data B2-out represent a receive carrier detection signal CD (8 Kbps) and a transmit enable signal CS (8 Kbps) of the RS-232D, respectively and the two remaining bits of the up-stream data B2-IN represent a transmit request signal RS (8 Kbps) and a transmit enable signal CS (8 Kbps) of the RS-232D, respectively. The down-stream data B2-out is first inputted to a serial/parallel converting circuit 69 and separated to communication data, a receive carrier detection signal CD and a transmit enable signal CS. The communication data are further inputted to a parallel/serial converting circuit 71 so as to be returned to 48 Kbps serial data. Further, the up-stream data from the data terminal 37 are first inputted to a serial/parallel converting circuit 73 so as to be returned to 64 Kbps parallel data, and then inputted to a parallel/serial converting circuit 75 so as to form an 8-bit up-stream data B2-IN composed of a transmit request signal RS and a transmit enable signal CS.

The telephone control microcomputer 57 is provided with functions to control the telephone circuit 33 (e.g. bell ringing, on/off of various displays, etc.) on the basis of the D channel down-stream data D-out, and to output control data to a selector 63 in response to signals (e.g. hook signals, selection signals, etc.) applied from the telephone set circuit 33. The selector 63 selects control data from either one of the telephone control microcomputer 57 and data communication control microcomputer 59 under control of the telephone control microcomputer 57, and transmits the selected control data to the ping-pong transmit circuit 55 as the D channel up-stream data D-IN. When transmitting control data, the telephone control microcomputer 57 controls the selector 63 so that control data transmitted from itself can be selected, and inhibits itself from transmitting control data to the data communication control microcomputer 59. Therefore, only when the telephone control microcomputer 57 is not transmitting control data, the data terminal control microcomputer 59 is allowed to transmit control data to the key service unit 1 via the D-channel.

The data communication control microcomputer 59 is provided with functions to control a called display signal CI and a data-set-ready signal DR of the RS-232D interface to be given to the data terminal 37 on the basis of the D channel down-stream data D-OUT, to form and output control data to be transmitted to the data terminal 37, and to select either one of command reception mode or communication mode. Here, in the command reception mode, only the data communication control microcomputer 59 has access to the transmit data SD and the receive data RD of the RS-232D. In the communication mode, on the other hand, the transmit data SD and the receive data RD of the RS-232D are transparently transmitted to or received from the key service unit 1 via the B2 channel. In practice, this mode selection is executed by the selectors 65 and 67 controlled by the data communication control microcomputer 59. In more detail, in the communication mode, the selector 65 selects the down-stream communication data from the parallel/serial converting circuit 71 as receive data, and further the selector 67 selects the transmit data SD of the RS-232D to transmit them to the serial/parallel converting circuit 73. In the command reception mode, on the other hand, the selector 65 selects control data from the data communication control microcomputer 59 as the receive data RD, and further the selector 67 selects a high level constant signal (indicative of no data) applied by a supply voltage V.

In addition, the data terminal control microcomputer 59 is provided with a function to form control data to be given to the key service unit 1 on the basis of the terminal ready signal ER and the transmit data SD of the RS-232D of the data terminal 37, to transmit the formed control data to the ping-pong transmit circuit 55 as the D channel up-stream data D-IN.

Figure 4:
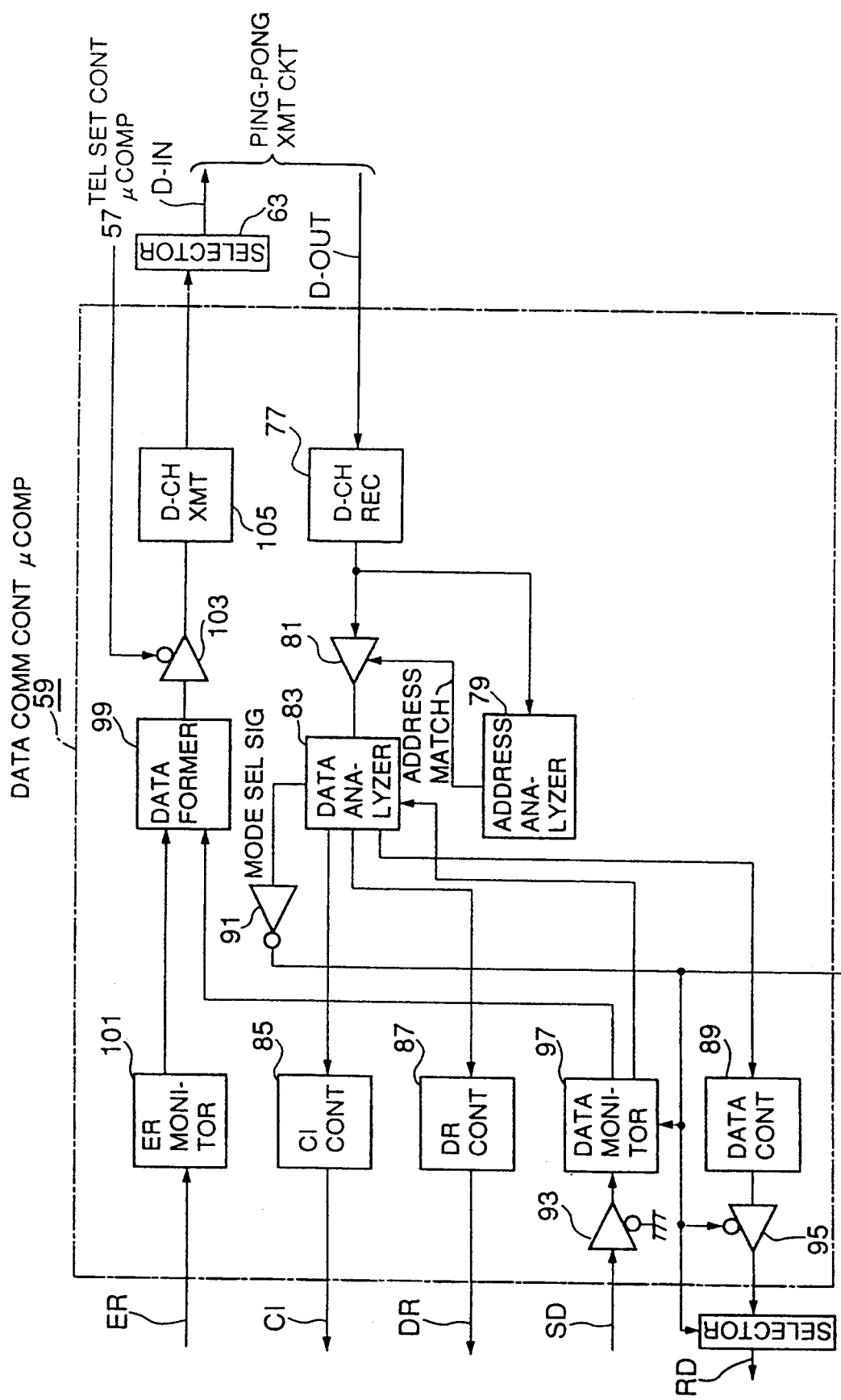
FIG. 4 is a block diagram showing a data communication control microcomputer 59 shown in FIG. 2.

FIG. 4 shows a detailed configuration of the data communication control microcomputer 59. In this microcomputer 59, a D-channel receive section 77 receives the D channel down-stream data D-OUT from the ping-pong transmit circuit 55, and transmits a transmit destination address included in the received data to an address analysis section 79. This address analysis section 79 opens a gate 81 when the transmit destination address is an address of this data communication control microcomputer 59 and opens the gate 81 when the transmit destination address is an address of the telephone control microcomputer 57. Once the gate 81 opens, the D channel down-stream data D-IN is transmitted to a data analysis section 83. According to the result of the data analysis section 83, a CI control section controls the called display signal CI of the RS-232D; the DR control section 87 controls the data-set-ready signal DR; the data control section 89 outputs control data; or the mode select signal is switched to the command reception mode or the communication mode. The mode selection signal which is at low level in the communication mode but at high level in the command reception mode is applied to a gate 95 via an inverter 91. That is, the gate 95 is kept open only in the command reception mode, to transmit control data from the data control section 89 to the data terminal 37 as receive data RD of the RS-232D.

A data monitor section 97 receives the transmit data SD from the data terminal 37 via a gate 93, analyzes it, and transmits the analyzed result to a data form section 99. This data monitor section 97 responsive to the mode selection signal monitors a data different in kind, according to the command reception mode and the communication mode as described later. If the data monitor section 97 receives a specific data in the communication mode and indicates it to a data analysis section 127, the data analysis section 127 switches the mode selection signal from the communication mode to the command mode.

An ER monitor section 101 monitors the terminal ready signal ER of the RS-232D and transmits a data indicative of whether the data terminal 37 is ready or not, to the data forming section 99. In response to the above data, the data form section 99 forms the D channel data to be given to the key service unit 1, and then gives it to a gate 103. Under control of the telephone set control microcomputer 57, the gate 103 is kept open only when this telephone control microcomputer 57 is not transmitting control data. When the gate 103 is open, the D channel data formed by the data form section 99 is transmitted to a D channel transmit section 105, and then given to the ping-pong transmit circuit 55 via the selector 63 as the D channel up-stream data D-IN.

The procedure of automatic calling party number signal transmission and called party number signal reception procedure are executed by call connection and restoration processing in accordance with the transmission and reception of control data referred to as commands (e.g. [CALLING PARTY NO. SIG TRANSMIT], [CALLED PARTY NO. SIG RECEIVE], [CONNECT, DIAL SIG], [DISCONNECT REQUEST], [SPEECH END], etc.) between the data terminal 37 and the data interface unit 35 on the basis of the transmit data SD and the receive data RD. The data interface unit 35 is in the command reception mode when standing by, so that the data communication control microcomputer 59 monitors and controls the above various commands. In progress of call-connection processing, the data interface unit 35 changes from the command reception mode to the communication mode. After having once changed to the communication mode, the data communication control microcomputer 59 monitors only [DISCONNECT REQUEST] and [SPEECH END], and is returned to the command reception mode in response to these commands. The automatic calling party number signal transmission and called party number signal reception procedure is prescribed by CCITT Recommendation V. 25 bis, for instance.

Figure 5:
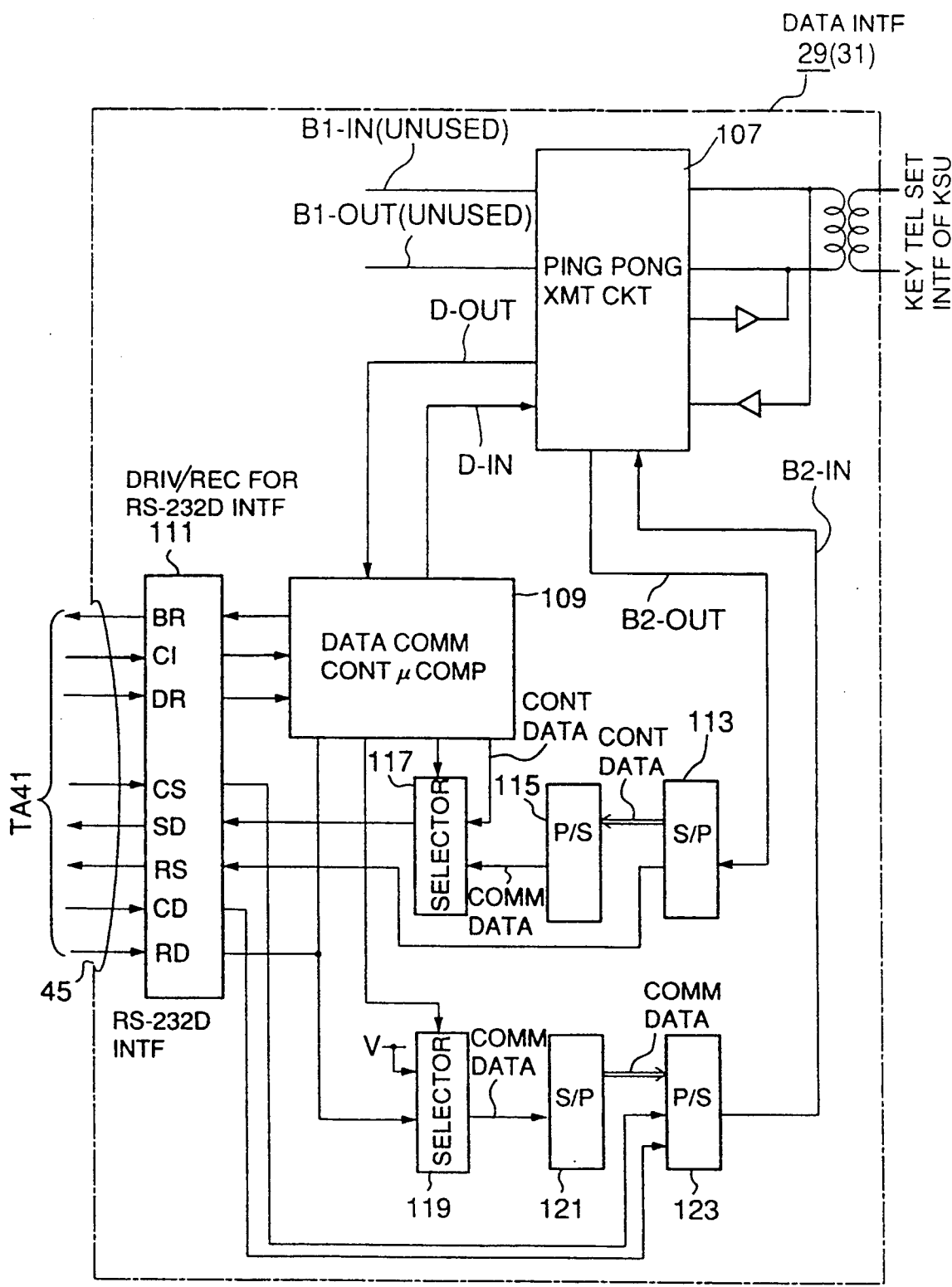
FIG. 5 is a block diagram showing a data interface unit 29 (31) shown in FIG. 1.

FIG. 5 shows the data interface unit 29 for connecting the TA 41 to the digital telephone set interface unit 15 of the key service unit 1. Further, the data interface unit 31 connected between the modem 43 and the key service unit 1 is the same in configuration as the interface unit 29.

Although being similar to the data interface unit 25 for the data terminal shown in FIG. 2, this data interface unit 29 is mainly different in configuration from the interface unit 35 in the following point: the data interface unit 29 is set to the terminal mode for the TA 41; however, the data interface unit 35 is set to the modem mode for the data terminal 37. In other words, the direction of signal wires of the RS-232D interface is opposite to each other. In addition, since the data interface unit 29 is not incorporated in a telephone set, the B1 channel for transmitting speech data is unused; no telephone control microcomputer is provided; and no selector is provided for selecting the telephone control upstream control data and the data communication control up-stream control data.

Figure 6:
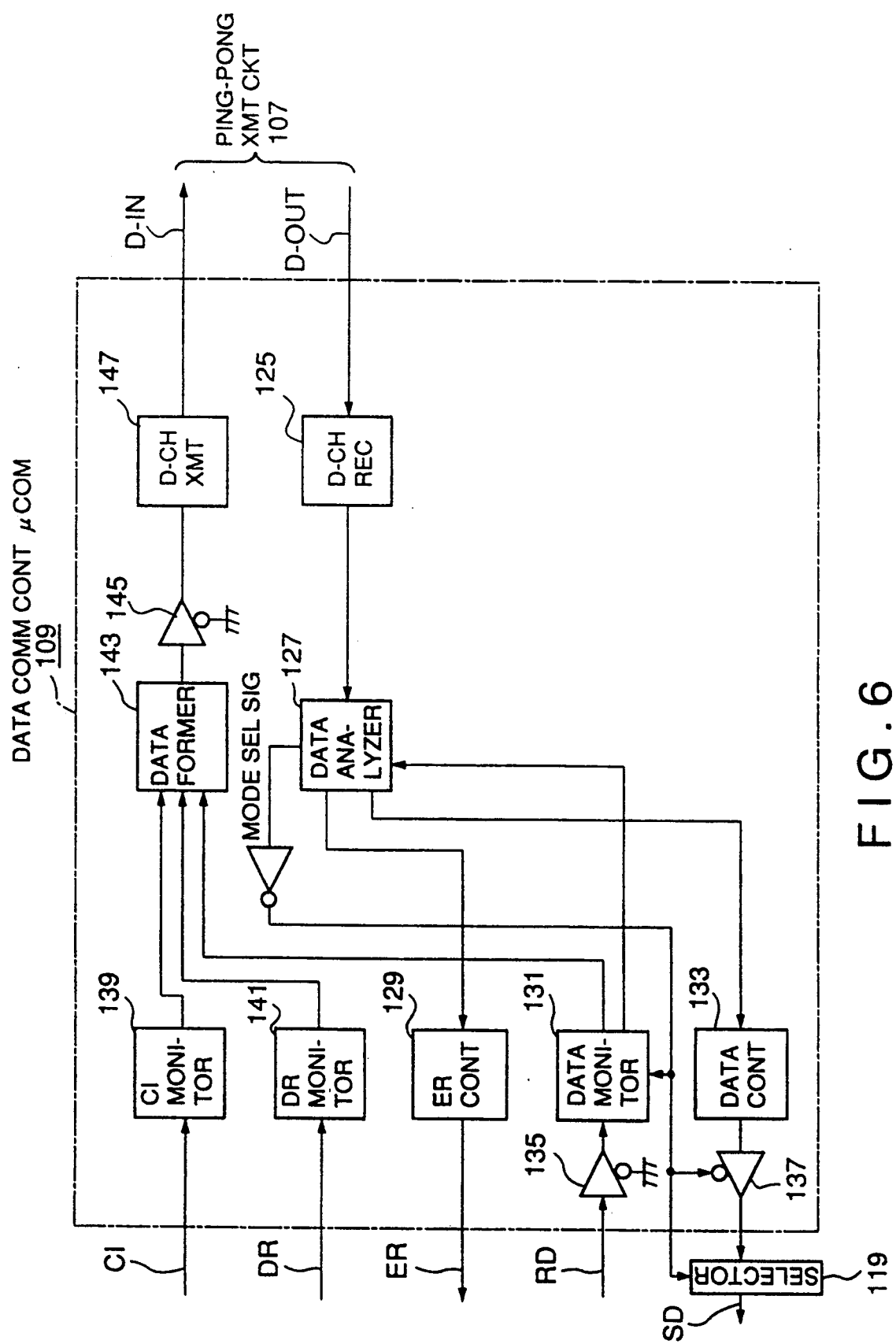
FIG. 6 is a block diagram showing a data communication control microcomputer 109 shown in FIG. 5.

FIG. 6 shows the data communication control microcomputer 109 in the data interface unit 29. The major difference in configuration between this microcomputer 109 and the data communication control microcomputer 59 in the telephone set shown in FIG. 4 is caused by the fact that the direction of signal wires of the RS-232D interface is opposite to each other. That is, the difference between the two can be well understood on the basis of the description with reference to FIG. 4, thus the detailed description being omitted herein. Further, since the telephone control microcomputer is not included, no gate for selecting the received downstream data D-out according to the transmit destination address exists. Further, the gate 145 for transmitting the upstream data D-IN is kept opened.

FIG. 7 shows the digital telephone set interface unit 13 incorporated in the key service unit 1 to connect the digital telephone set 27 to the key service unit 1. Further, the digital telephone set interface units 15 and 17 for connecting the data interface units 29 and 31 to the key service unit 1 are the same in configuration as this interface unit 13.

This interface unit 13 is provided with 8 ping-pong transmit circuits $149_1$ to $149_8$, for instance, each of which is connected to the data interface unit 35 in each telephone set 27 via each data transformer 151 for digital transmission, to execute ping-pong transmission via the time division channels of 2B+D form between the two. This ping-pong transmission circuit 149 is the same in configuration as the ping-pong transmit circuit 55 in the data interface unit 35 shown in FIG. 3, except that the former is activated in master mode but the former is activated in slave mode. In other words, the ping-pong transmit circuit 149 activated in the master mode has the leadership in packet ping-pong transmission.

A timer slot assigner 153 receives a frame synchronizing signal and a clock through a PCM highway 7, and indicates to each ping-pong transmit circuit 149 timings at which the respective ping-pong transmit circuits 149 transmit or receive B channel up- and down-stream data to or from the PCM highway 7. That is, each ping-pong transmit circuit 149 has direct access to the PCM highway 7 at each time designated by the time slot assigneer 153 to receive and transmit the up- and down-stream data at speed of 2.048 Mbps.

A control data communication microcomputer 155 provided with a memory circuit therein monitors the D-channel (control) data transmitted or received by each ping-pong transmit circuit 149, and controls the communications of these control data with the control unit 3 via the data highway 5.

Figure 8:
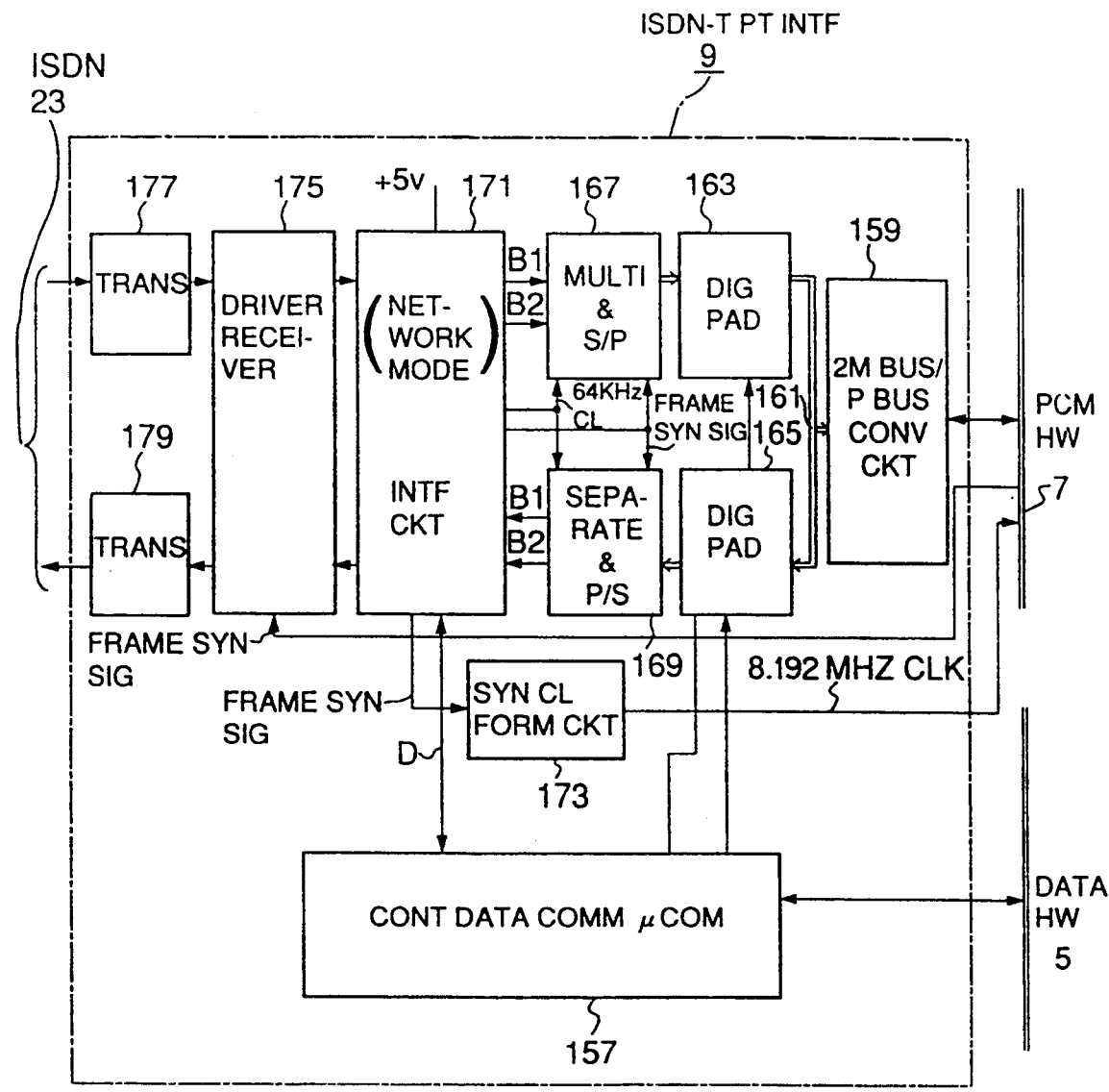
FIG. 8 is a block diagram showing an ISDN-T point interface unit 9 shown in FIG. 1.

FIG. 8 shows an ISDN-T point interface unit 9 in the key service unit 1 including one line of a basic rate 2B+D.

A control data communication microcomputer 157 provided with a memory circuit therein monitors the control data of the ISDN 23, and controls communications of these control data with the control unit 3 via the data highway 5. Further, this microcomputer 157 controls digital pads 163 and 165 on the basis of the control data from the control data.

A 2M bus/parallel bus converting circuit 159 is provided with a memory unit for absorbing a difference in phase of the frame synchronizing signal between the ISDN 23 and the PCM highway 7, and converts signals on the PCM highway 7 into those on the parallel bus 161 or vice versa. The digital pads 163 and 165 are digital memory units for regulating the speech level, which are both bypassed during data communications.

A multiplex and serial/parallel converting circuit 167 multiplexes and serial/parallel converts two B channel data from the ISDN 23. Further, a separate and parallel/serial converting circuit 169 serial/parallel converts and separates two B channel data from the parallel bus 161.

An interface circuit 171 controls the processing of the ISDN layers 1 to 3, and further combines and separates two B channel data and a D channel data. Since being set to a network mode, this interface circuit 171 forms a frame synchronizing signal synchronized with the ISDN 23 and is activated by this formed synchronizing signal. The frame synchronizing signal formed by the interface circuit 171 is also given to a synchronizing clock forming circuit 173. The synchronous clock forming circuit 173 forms a clock 8.192 MHz) synchronized with the frame synchronizing signal and transmits it to the control unit 3 via the PCM highway, so that the key service unit 1 is entirely synchronized with the ISDN 23.

A driver/receiver 175 converts a ternary signal (AMI code) used for the ISDN 23 to a binary signal (0 V, +5 V) used for the key service unit or vice versa. This driver/receiver 175 is connected to the ISDN 23 via digital transmit pulse transformers 177 and 179.

Figure 9:
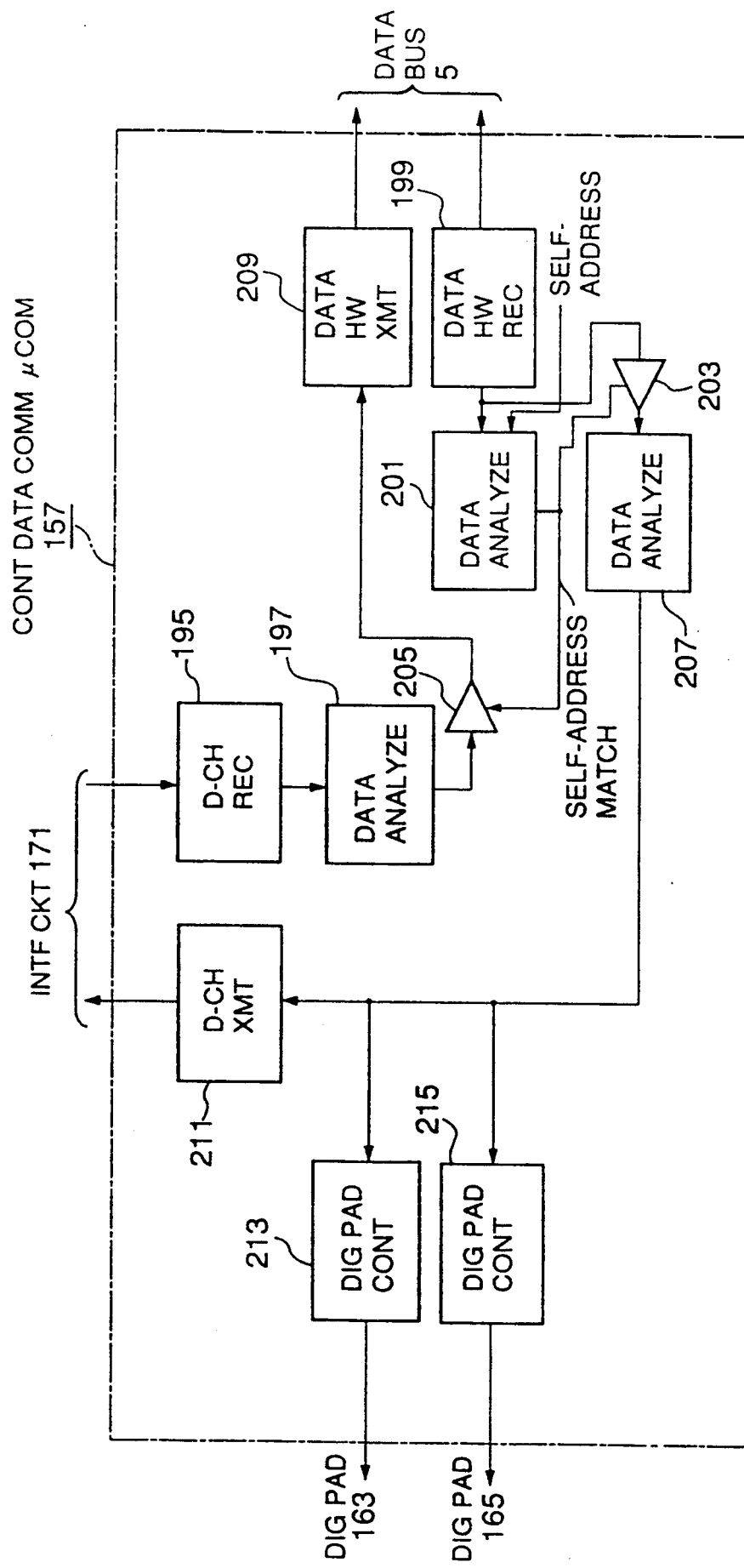
FIG. 9 is a block diagram showing a control data communication microcomputer 157 incorporated in FIG. 8.

FIG. 9 shows the control data communicating microcomputer in the ISDN-T point interface unit 9, in detail.

In this computer 157, the D channel data inputted from the ISDN 23 via the interface circuit 171 are received by a D channel receive section 195; the data are analyzed by a data analyze section 197. Further, the control data inputted from the control unit 3 via the data highway 5 are received by a data highway receive section 199. A transmit destination address included in the control data is transmitted to an address analyze section 201 to compare the destination address with a predetermined self address. If both match each other, two gates 203 and 205 are opened. Therefore, the analyzed result of the data analyze section 197 is inputted to a data highway transmit section 209, and transmitted to the control unit 3 via the data highway 5. Simultaneously, the control data transmitted from the control unit 3 and received by the data highway receive section 195 are given to the data analyze section 203, and a D channel transmit section 211 transmits D channel data to be given to the ISDN 23 to the interface circuit 171 according to the result analyzed by the data analyze section 203. Further, the digital pad control section 213 and 215 control the digital pads 163 and 165.

FIG. 10 shows the interface circuit 171 in the ISDN-T point interface unit 9 in detail.

In this interface circuit 171, a 2B+D data packet inputted from the ISDN 23 via a driver/receiver 175 is divided into each channel data by the 2B+D separate circuit 181. The D channel data is transmitted to the control data communicating microcomputer 157 and the two B channel data are transmitted to the multiplex and serial/parallel converting circuit 169. On the other hand, the 2B+D form circuit 183 combines the D channel data inputted from the control data communicating microcomputer 157 and two B channel data inputted from the separate and parallel/serial converting circuit 169 so as to form a 2B+D data packet, and transmits the formed data packet to the ISDN 23 via the driver/receiver 175.

This interface circuit 17 is set to the network mode, so that the mode selection signal MODE is set to high level (+5 V) to open the gate 187 and close the gate 189. Under these conditions, the start bit monitor section 18 detects a start bit of a data packet from the ISDN. The detected signal is applied to a frame synchronizing signal forming circuit 191 via the gate 187 to form a frame synchronizing signal synchronized with the start bit. This formed synchronizing signal is transmitted to a 2B+D separate circuit 181 and a 2B+D form circuit 183. Further, a clock forming circuit 193 forms a clock of 64 kHz in synchronism with the frame synchronizing signal and transmits the formed clock to the 2B+D separate circuit 181 and the 2B+D form circuit 183. Therefore, the interface circuit 171 operates in synchronism with the ISDN. Further, the frame synchronizing signal is given to the synchronizing clock forming circuit 173, the multiplex and serial/parallel converting circuit 167, and the separate and parallel/serial converting circuit 169, and additionally the 64 kHz clock is given to the multiplex and serial/parallel converting circuit 167 and the separate and parallel/serial converting circuit 169, so that these circuits are activated in synchronism with the ISDN.

Figure 11:
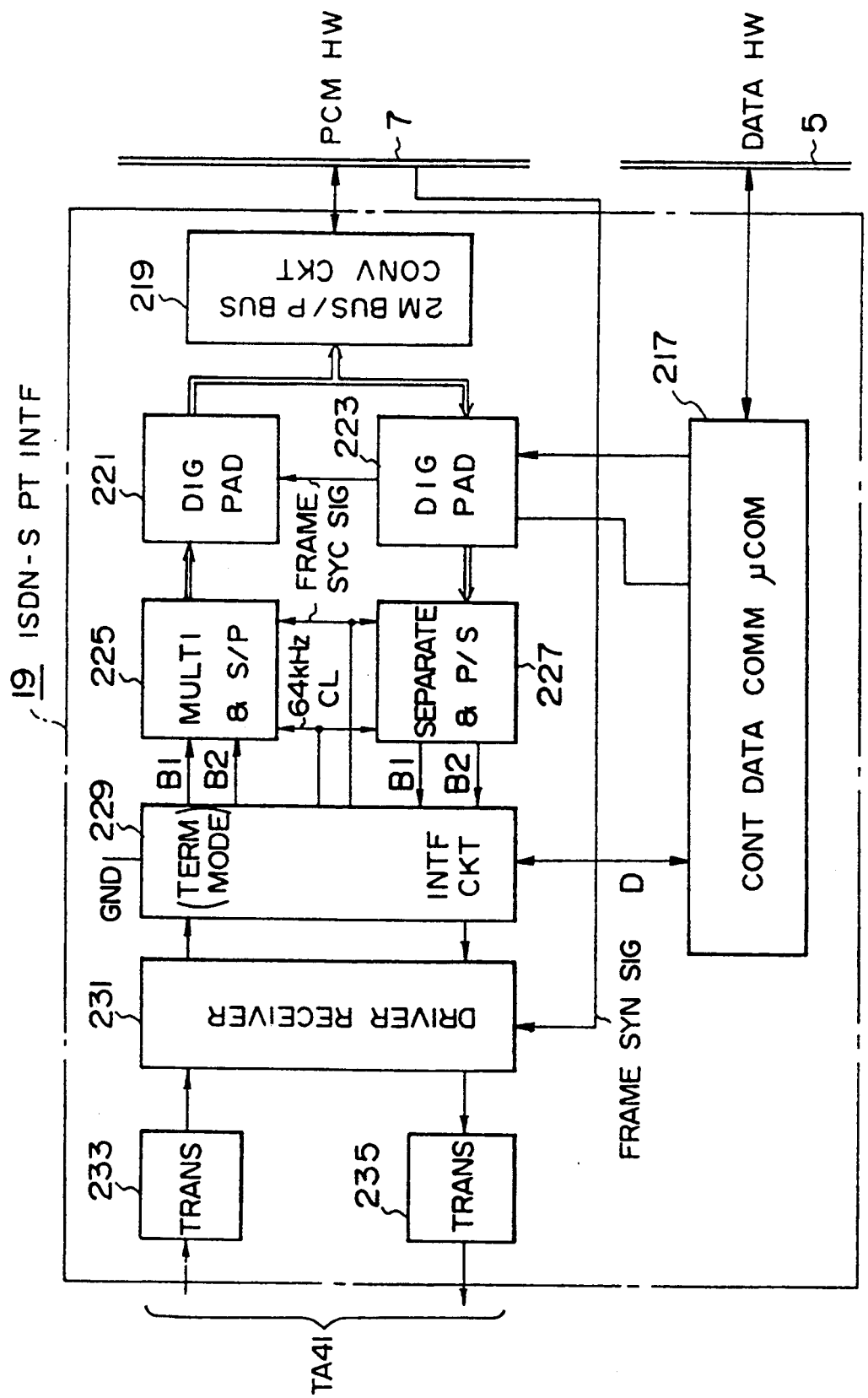
FIG. 11 is a block diagram showing an ISDN-S point interface unit 19 shown in FIG. 1.

FIG. 11 shows the ISDN-S point interface unit 19 connected to the ISDN connecting terminal of the TA 41.

This interface unit 19 is the same in configuration as the ISDN-T point interface unit 9 shown in FIG. 8, except that the interface circuit 229 is set to the terminal mode. In more detail, since this interface circuit 229 configured in the same way as in FIG. 10 is set to the terminal mode, the mode select signal MODE is grounded at low level. Therefore, the frame synchronizing signal is introduced from the PCM highway 7 via the open gate 189, so that the ISDN-S point interface unit 19 is activated in synchronism with the frame synchronizing signal. Since being synchronized with the key service unit 1, no synchronizing clock forming circuit 173 shown in FIG. 8 is required.

Figure 12:
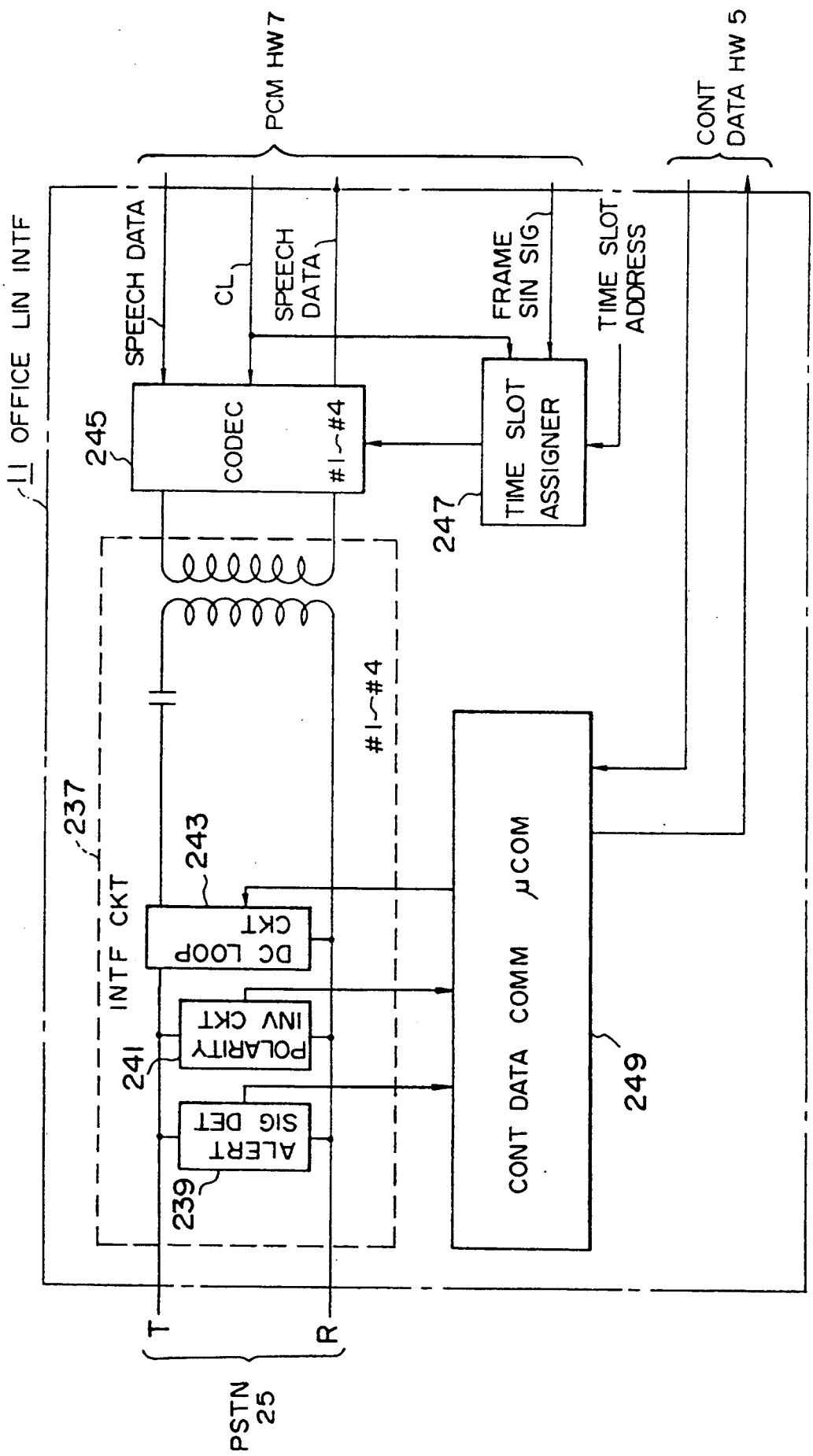
FIG. 12 is a block diagram showing an office line interface unit 11 shown in FIG. 1.

FIG. 12 shows an office line interface unit 11 for connecting the PSTN (public subscriber telephone network) 25.

An interface circuit 237 provided with an alerting signal detecting circuit 239, a polarity inversion detecting circuit 241 and a dc loop circuit 243 is connected to one office line of the PSTN 25 to detect an alerting signal from an office line, detect a polarity inversion of the office line, open/close the dc loop, and transmit a dial pulse to the office line. A codec 245 A/D or D/A converts speech signals, and is coupled to the office line into AC fashion when the dc loop is closed by the dc loop circuit 243. A plurality (e.g. 4) of pairs of the interface circuit 237 and the codec 245 are incorporated in each office line interface unit 11.

A time slot assigner 247 determines timings at which each codec 245 receives and transmits speech data via the PCM highway 7 on the basis of a predetermined time slot address for each codec, the frame synchronizing signal from the PCM highway, and the clock, and further indicates each timing signal to each codec 245. Therefore, each codec 245 receives and transmits speech data from and to the PCM highway 7 at the timing assigned by the time slot assigner 247.

A control data communicating microcomputer 249 transmits and receives control data related to the detection signal monitoring of the alerting signal detection circuit 239 and the polarity inversion circuit 241, the control of the dc loop circuit 243, the alerting signal detection to and from the control unit 3 via the control data highway 5, the detection of polarity inversion, the opening/closing of the dc loop, the transmission of the dial pulse, etc.

FIG. 13 shows the standard telephone set interface unit 21 to which the modem 43 is connected.

An alerting signal transmit circuit 251 transmits an alerting signal (16 Hz) supplied by an alerting signal generator 253 to the modem 43. A dc voltage supply circuit 255 supplies a predetermined dc voltage to the modem 43, inverts the polarity thereof, and detects the opening/closing the dc loop. A dial detect section 257 detects a dial pulse.

A codec 259 A/D and D/A converts speech signals, and transmits and receives speech data to and from the PCM highway 7 at the timing assigned by the time slot assigner 261.

A control data communicating microcomputer 263 controls the transmit/stop of an alerting signal, monitors the opening/closing of the dc loop, controls the polarity inversion, monitors the detection result of the dial pulse, and communicates control data with the control unit 3 via the data highway 5.

The microcomputer 49 incorporated in the control unit 3 of the key service unit 1 will be described hereinbelow. This microcomputer 49 controls the entire call processing and exchange operation of the key telephone apparatus. However, there is explained only the configuration directly related to the present invention, that is, to the call processing and the exchange control of the data terminal 37 at called party number signal reception.

Figure 14:
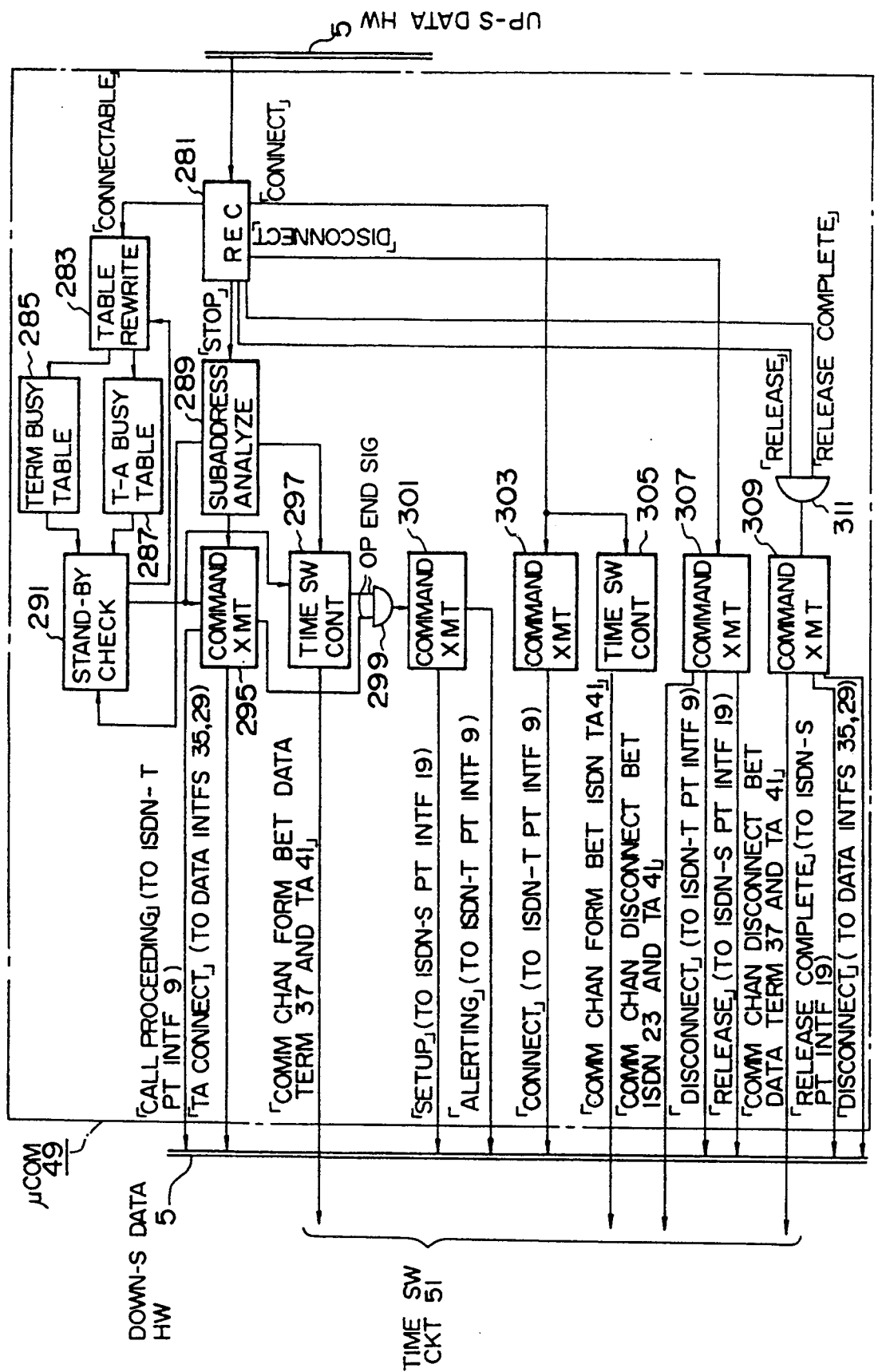
FIGS. 14, 15 and 17 are block diagrams showing a microcomputer 49 incorporated in a control unit 3 shown in FIG. 1.

FIG. 14 shows the configuration related to the control of called party number signal reception through the ISDN 23, in the microcomputer 49.

In the drawing, a receive section 281 receives and analyzes control data transmitted by various interface units in the key service unit via the data highway 5. When the data terminal 37 changes from busy status to standby status, a command [CONNECTABLE] is transmitted from the digital telephone set interface unit 13 to the receive section 281. In response to this command, a table rewrite section 283 writes [0] indicative of standby status in a corresponding extension telephone number's column in the terminal busy table 285. Similarly, when the TA 41 changes from busy status to standby status, a command [CONNECTABLE] is given from the digital telephone set interface unit 15 to the receive section 281, with the result that [0] indicative of standby status is written in a TA busy table 287.

The called party number signal reception from the ISDN 23 is processed by inputting a command referred to as [SETUP] via the D channel. This [SETUP] command includes subaddresses (extension telephone numbers, usually) as parameters so as to select any extension telephone set. In response to this [SETUP] command, a subaddress analyze section 289 analyzes a subaddress included in the command, and indicates it to a standby check section 291. The standby check section 291 checks whether a selected data terminal 37 is in standby status or not with reference to the extension telephone number column corresponding to the subaddress in the terminal busy table 291, and simultaneously checks the TA 41 status with reference to the TA busy table. As a result, if both are in standby status, a command transmit section 295 returns a command [CALL PROCEEDING] to the ISDN-T point interface unit 9 which has transmitted the command [SETUP], and in addition the selected data terminals 37 and TA 41 transmit a command [TA CONNECT] to the respective connected data interface units 35 and 29. At the same time, a time switch control section 297 instructs the time switch circuit 51 to exchange time slots allocated to the B2 channel of the data interface units 35 and 29, respectively (i.e. a data communication channel is formed between the data terminal 37 and the TA 41). Further, a table rewrite section 283 writes [1] indicative of busy status in the extension telephone number column corresponding to the subaddress of the terminal busy table 285 and the TA busy table 287.

After the operations of the command transmit section 295 and the time switch control section 297 have been completed, a command transmit section 301 transmits a command [SETUP] indicative of a called party number signal reception of the ISDN to the ISDN-S point interface unit 19, and additionally a command [ALERTING] indicative of extension telephone set calling to the ISDN-T point interface unit 9.

After the above command [SETUP] has been transmitted, the TA 41 responds thereto, so that a command [CONNECT] is inputted from the ISDN-S point interface unit 21 to the receive section 1. Then, a command transmit section 303 transmits the command [CONNECT] to the ISDN-T point interface unit 9, and additionally a time switch control section 305 instructs the time switch circuit 51 to exchange time slots allocated to the ISDN-T point interface unit 9 and the ISDN-S point interface unit 19, respectively (i.e. a data communication channel is formed between the TA 41 and the ISDN 23).

When the data communication is required to be completed from the data terminal (37) side, a command [DISCONNECT] is inputted from the ISDN-S point interface unit to the receive section 281. Then, a command transmit section 307 controls the time switch circuit 51 to disconnect the data communication channel between the TA 41 and the ISDN 23, and transmits a command [DISCONNECT] to the ISDN-T point interface unit 9 and a command [RELEASE] to the ISDN-S point interface unit 19.

Thereafter, a command [RELEASE] is returned from the ISDN-T point interface unit 9, and a command [RELEASE COMPLETE] is returned from the ISDN-S point interface unit 19. In response to both the returned commands, a command transmit section 309 controls the time switch circuit 51 to disconnect the data communication channel between the data terminal 37 and the TA 41, and transmits a command [RELEASE COMPLETE] to the ISDN-T point interface unit 9 and a command [DISCONNECT] to the data interface units 35 and 29 connected to the data terminal 37 and the TA 41, respectively.

Figure 15:
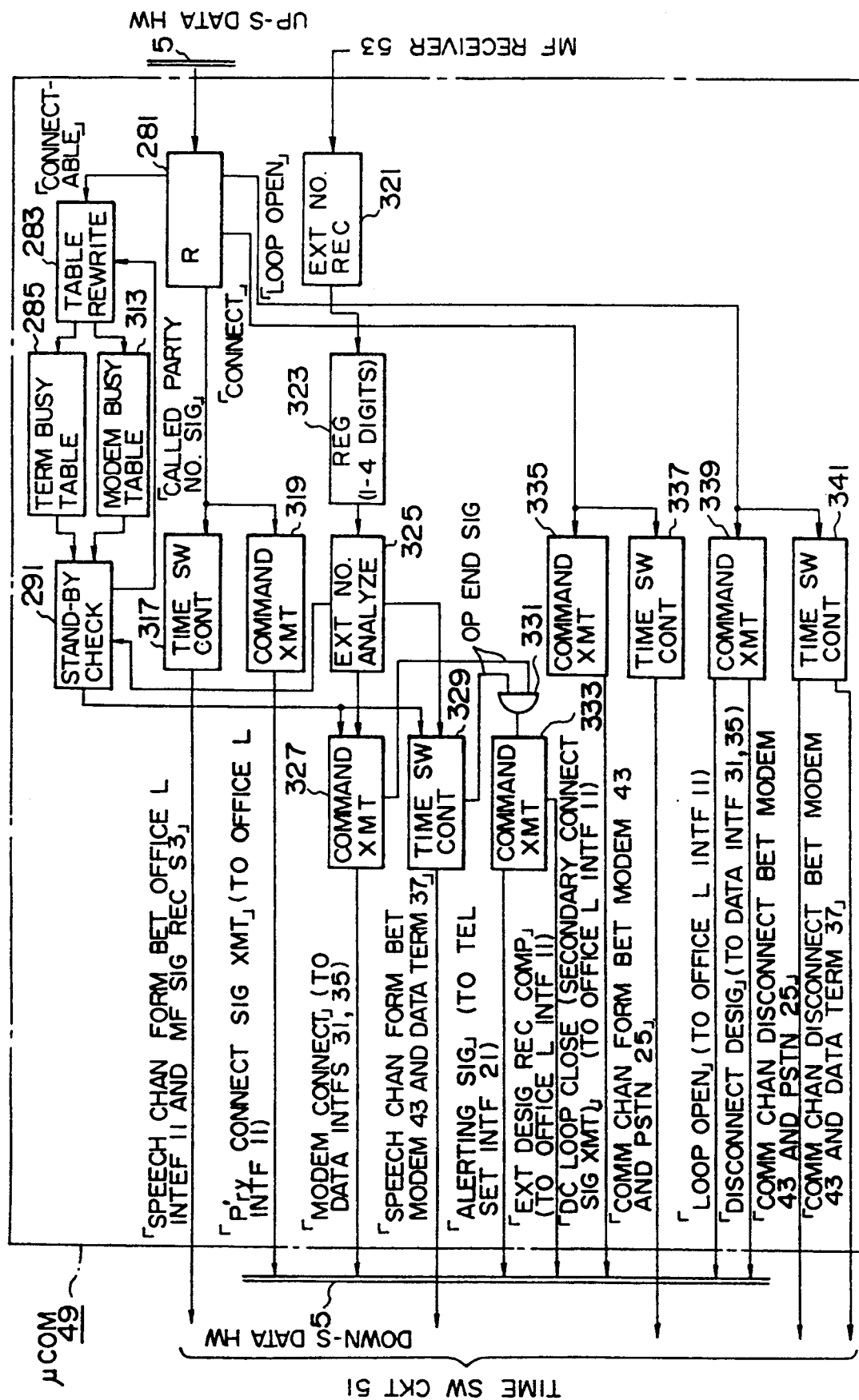
Figure 16:
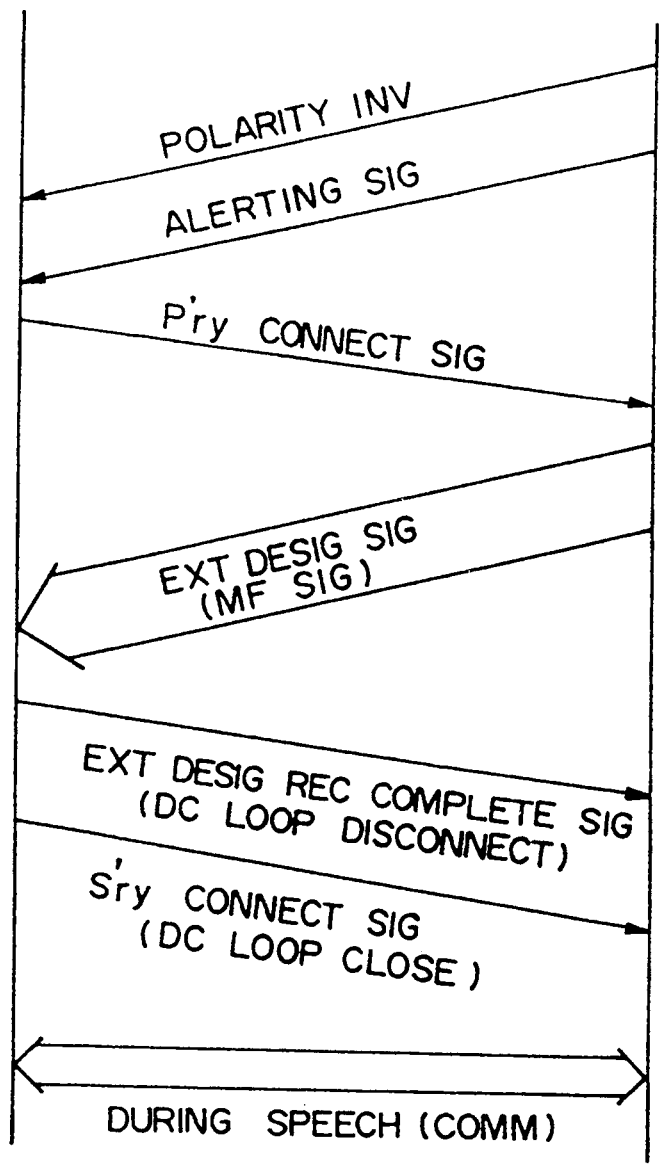
FIG. 16 is a sequence chart executed at dial-in service.

FIG. 15 shows the partial configuration of the microcomputer 15, which relates to the control at the called party number signal reception from the PSTN 25. Further, the same reference numerals have been retained for similar elements shown in FIG. 14. The above configuration is formed on the assumption that the key telephone system receives dial-in service from the PSTN 25. FIG. 16 shows a communication sequence prescribed by the PSTN 25 at the dial-in service between the office line interface unit 11 of the key service unit and the PSTN 25.

Prior to the description of FIG. 15, a sequence shown in FIG. 16 will be described hereinbelow simply. At the called party number signal reception, an office line polarity inversion signal and an alerting signal are inputted in sequence from the PSTN 25 to the office line interface unit 11. Thereafter, when the office line interface unit 11 transmits a primary response signal to the PSTN 25, an extension telephone designation signal (an MF signal of 4 digits indicative of an extension telephone number) is given. When the office line interface unit 11 transmits an extension telephone designation receive signal (the dc loop is disconnected) and a secondary response signal (the dc loop is closed) to the PSTN 25, speed (data communication) can be started.

FIG. 15 will be described hereinbelow.

In the same way as with the case of the data terminal 36 and the TA 4, when the modem 43 changes from the busy status to the standby status, a command [CONNECTABLE] is inputted from the data interface unit 31 connected to the modem 43 to a receive section 281, so that a table rewrite section 283 writes [0] indicative of standby status in a modem busy table 313.

When a polarity inversion signal and then an alerting signal are transmitted from the PSTN 25 to the office line interface unit 11, a command [CALLED PARTY NUMBER SIGNAL RECEIVE] is transmitted from the office line interface unit 11 to the receive section 281. Therefore, a time switch control section 317 controls the time switch circuit 5 so as to form a speech channel between the office line interface unit 11 and the MF receiver 53 in the control unit. Simultaneously, a command transmit section 319 instructs the office line interface unit 11 to transmit the primary response signal to the PSTN 25.

Thereafter, when an extension telephone designate signal is transmitted from the PSTN 25 in the form of the MF signal, this extension telephone designate signal is received by the MF signal receiver 53 for analysis. That is, the designated extension telephone number data is given from the MF signal receiver 53 to an extension telephone number receive section 321 and stored in a register. This stored extension telephone number is analyzed by an extension telephone number analyze section 325, and the analyzed result is transmitted to a standby check section 291.

The standby check section 291 checks the status of the selected data terminal 37 with reference to the column of the extension telephone number corresponding to the above analyzed result, and simultaneously checks the status of the modem 43 with reference to a modem busy table 313. As the result of the above check, if both are in standby status at the same time, a command transmit section 327 transmits a command [MODEM CONNECT] to the data interface unit 31 connected to the modem 43 and the data interface unit 35 connected to the data terminal 37, respectively, and further a time switch control section 329 controls the time switch circuit 51 to form a communication channel between the modem 43 and the data terminal 37. Further, the table rewrite section 283 writes [1] indicative of busy status in the respective corresponding columns in the terminal busy table 285 and the modem busy table 313.

After these operations have been completed, a command transmit section 333 transmits a command [ALERTING SIGNAL] to the standard telephone set interface unit 21 connected to the modem 43, and further a command [EXTENSION TEL DESIGNATE RECEIVE COMPLETE] to the office line interface unit 11.

Thereafter, when the data terminal 37 responds to the alerting, a command [CONNECT] is inputted from the standard telephone set interface unit 21 to the receive section 281. Then, the command transmit section 335 instructs the office line interface unit 11 to close the dc loop (secondary response signal is transmitted), and additionally a time switch control section 337 controls the time switch circuit 51 to form a communication channel between the modem 43 and the PSTN 25.

When the communication is required to be ended from the data terminal 37, a command [LOOP OPEN] is inputted from the standard telephone set interface unit 21 to the receive section 281. Then, the command transmit section 339 transmits this command [LOOP OPEN] to the office line interface unit 11, and further transmits a command [DISCONNECT INSTRUCTION] to the data interface units 321 and 35. At the same time, a time switch control section 341 controls the time switch circuit 51 to disconnect both the communication channels between the modem 43 and the PSTN 25 and between the modem 43 and the data terminal 37.

Figure 17:
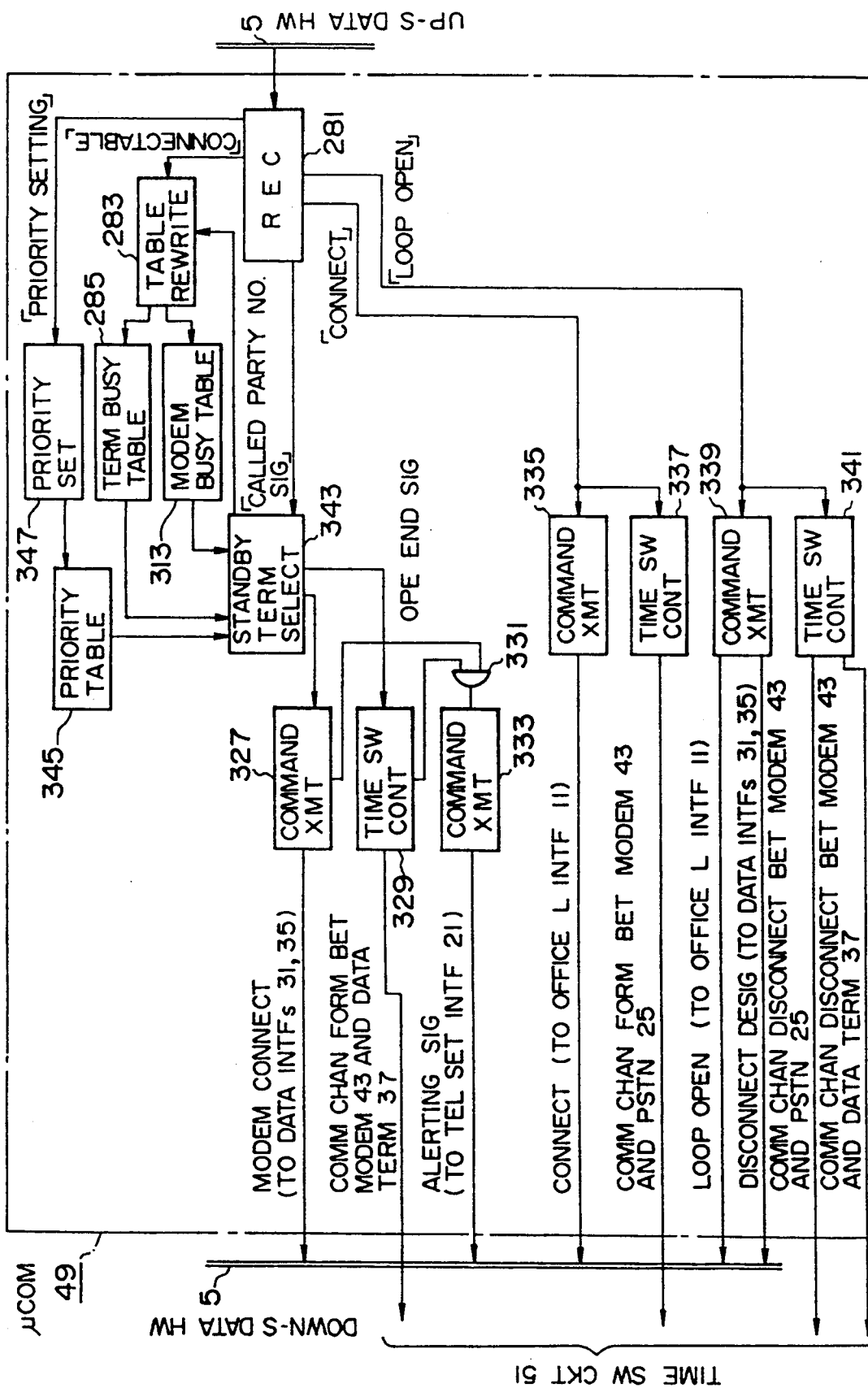

FIG. 17 shows the partial configuration of the microcomputer 49, which relates to the control at the called party number signal reception from the PSTN 25 without dial-in service. There are many common sections in configuration between FIGS. 15 and 17, so that only elements different from each other will be explained, hereinbelow.

In the case of non dial-in, a called party number signal reception for requesting data communication is acknowledged only when a called party number signal is received by a predetermined specific office line, in order to discriminate the called party number signal reception for requesting data communications and that for requesting telephone speech.

When a command [CALLED PARTY NO. SIGNAL RECEIVE] indicative of the specific office line is received by the receive section 281, a standby terminal select section 343 selects one of standing-by data terminals 37 with reference to the terminal busy table 285. In this case, one data terminal 37 having the highest priority is selected from among the standing-by data terminals 37, in accordance with the priority order of data terminals 37 previously listed in a priority table 345. At the same time, a standby terminal select section 343 checks whether the modem 43 is in standby state, with reference to the modem busy table. If the modem 43 is in standby status as the result of the above check, the standby terminal select section 343 indicates an extension telephone number of the selected data terminal 37 to a command transmit section 327 and a time switch control section 333. Then, the command transmit section 327 transmits a command [MODEM CONNECT] to the data interface units 31 and 35. Further, a time switch control section 329 controls the time switch circuit 51 to form a communication channel between the modem 43 and the data terminal 37. Further, the table rewrite section 283 writes [1] indicative of busy to the respective corresponding columns of the terminal busy table 285 and the modem busy table 313.

After these operations have been completed, the command transmit section 333 transmits a command [ALERTING SIGNAL] to the standard telephone set interface unit 21 connected to the modem 43.

The priority order in the priority table 345 can be set by inputting a command [PRIORITY SET] through key switches of the digital telephone set 27. In accordance with this command, a priority setting section 347 rewrites the priority table 345. The priority order can be determined in various modes. For instance, it is also possible to set a priority order to only a single data terminal 37, without setting any priority orders to other remaining data terminals. In this case, a called party number signal is always received by the single data terminal. Further, it is also possible to set mutually different or the same priority orders to some plural data terminals 37 or all the data terminals.

The elements other than those described above are the same as those shown in FIG. 15.

The operation of the embodiment configured as described above will be described hereinbelow.

Figure 18:
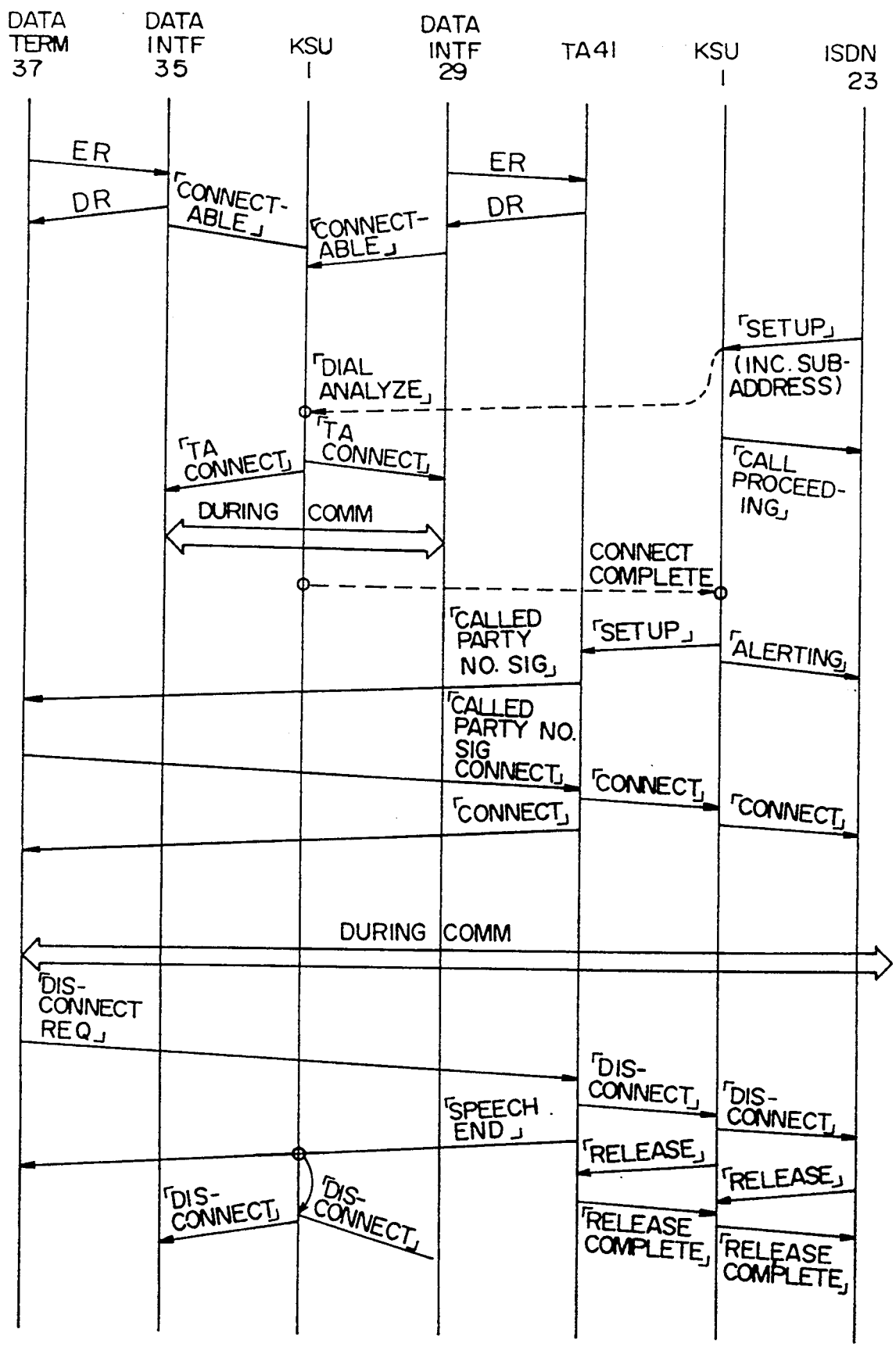
FIGS. 18, 19 and 20 are sequence charts for assistance in explaining the operation of the embodiment shown in FIG. 1.

The procedure for connecting the data terminal 37 to the ISDN 23 at the called party number signal reception from the ISDN 23, with reference to the sequence chart shown in FIG. 18.

The data interface unit 35 in each digital telephone set 27 always monitors the ready status of the standing-by data terminals 37. If the terminal ready signal ER is on, the data communication control microcomputer 59 detects this signal ER, turns on a data set-ready signal DR to the data terminal 37, and transmits a command [CONNECTABLE] to the control unit 3 of the key service unit. In response to this command [CONNECTABLE], the microcomputer 49 in the control unit 3 writes [0] in the corresponding terminal column of the terminal busy table 285. In the same way, the TA 43 and the data interface unit 29 monitors the ready status each other. In standby status, the data interface unit 29 always turns on the terminal ready signal ER. Under these conditions, if the TA 43 turns on the data set ready signal DR, the microcomputer 109 in the data interface unit 29 detects this signal DR, and transmits a command [CONNECTABLE] to the control unit 3 of the key service unit. In response to this command, the microcomputer 49 in the control unit 3 writes [0] in the TA busy table 285.

If a command [SETUP] from the ISDN 23 reaches, the interface circuit 171 in the ISDN-T point interface unit 9 separates this command from the control data, and transmits it from the microcomputer 171 to the control unit 3 in the key service unit via the control data highway 5. In response to the command [SETUP], the computer 49 in the control unit 3 checks whether the data terminal 37 of the extension telephone number corresponding to a subaddress included in this command is in standby status or not with reference to the terminal busy table 285, and further checks the TA busy table 287. As the check results, if both are in standby status, the computer 49 transmits a command [TA CONNECT] to the data interface units 35 and 29, and writes a busy bit of [1] in the corresponding columns of both the tables 285 and 287. Further, the computer 49 instructs the time switch circuit 51 to exchange the time slot of the extension telephone number and the time slot of the TA 41, that is, to form a data communication channel between the data terminal 37 and the TA 41, and further transmits a command [CALL PROCESSING] to the ISDN 23.

In response to the command [TA CONNECT], the microcomputer 59 of the data interface unit 35 controls the selectors 65 and 67, and sets the communication mode in which transmit/receive data SD and RD are transmitted/received as they are transparently. Once being set to the communication mode, the microcomputer 59 never monitors the transmit/receive data SD and RD, until a command [DISCONNECT REQUEST] is received.

In the same way, in response to the command [TA CONNECT], the microcomputer 109 in the data interface unit 29 controls the selectors 117 and 119 to the communication mode. Once being set to the communication mode, the computer 109 never monitors the transmit/receive data SD and FD until a command [DISCONNECT REQUEST] is received.

As described above, a data communication channel is formed between the TA 41 and the data terminal 37 by way of the TA 41, RS-232D interface 45, data interface unit 29, digital telephone set interface unit 15, PCM highway 7, digital telephone set interface unit 13, data interface unit 35, RS-232D interface 39, and the data terminal 37.

Upon completion of the above processing, the microcomputer 49 in the key service unit transmits a command [SETUP] to the TA 41 via the ISDN-S point interface unit 19, and a command [ALERTING] to the ISDN 23.

In response to the command [SETUP], the TA 41 transmits a command [CALLED PARTY NO. SIGNAL RECEIVE] as receive data RD of the RS-232D 45 from the TA 41 to the data interface unit 29. This command is received by the data terminal via the data communication channel. In response to this command [CALLED PARTY NO. SIGNAL RECEIVE], the data terminal 37 transmits a command [CALLED PARTY NO. SIGNAL RECEIVE CONNECT] as the transmit data SD to the RS-232D 39, and waits the arrival of a command [CONNECT].

In response to the command [CALLED PARTY NO. SIGNAL RECEIVE CONNECT] from the data terminal 37, the TA 41 transmits a command [CONNECT] to the ISDN-S point interface unit 19 and a command [CONNECT] as the receive data RD.

In response to the command [CONNECT] from the TA 41, the microcomputer 49 of the key service unit transmits a command [CONNECT] to the ISDN 23 and instructs the time switch circuit 51 to exchange the time slot allocated to the ISDN-T point interface unit 9 and the time slot allocated to the ISDN-S point interface unit 19, that is, to form a communication channel between the ISDN 23 and the TA 41. As explained above, data communications start between the ISDN 23 and the data terminal 37.

Figure 19:
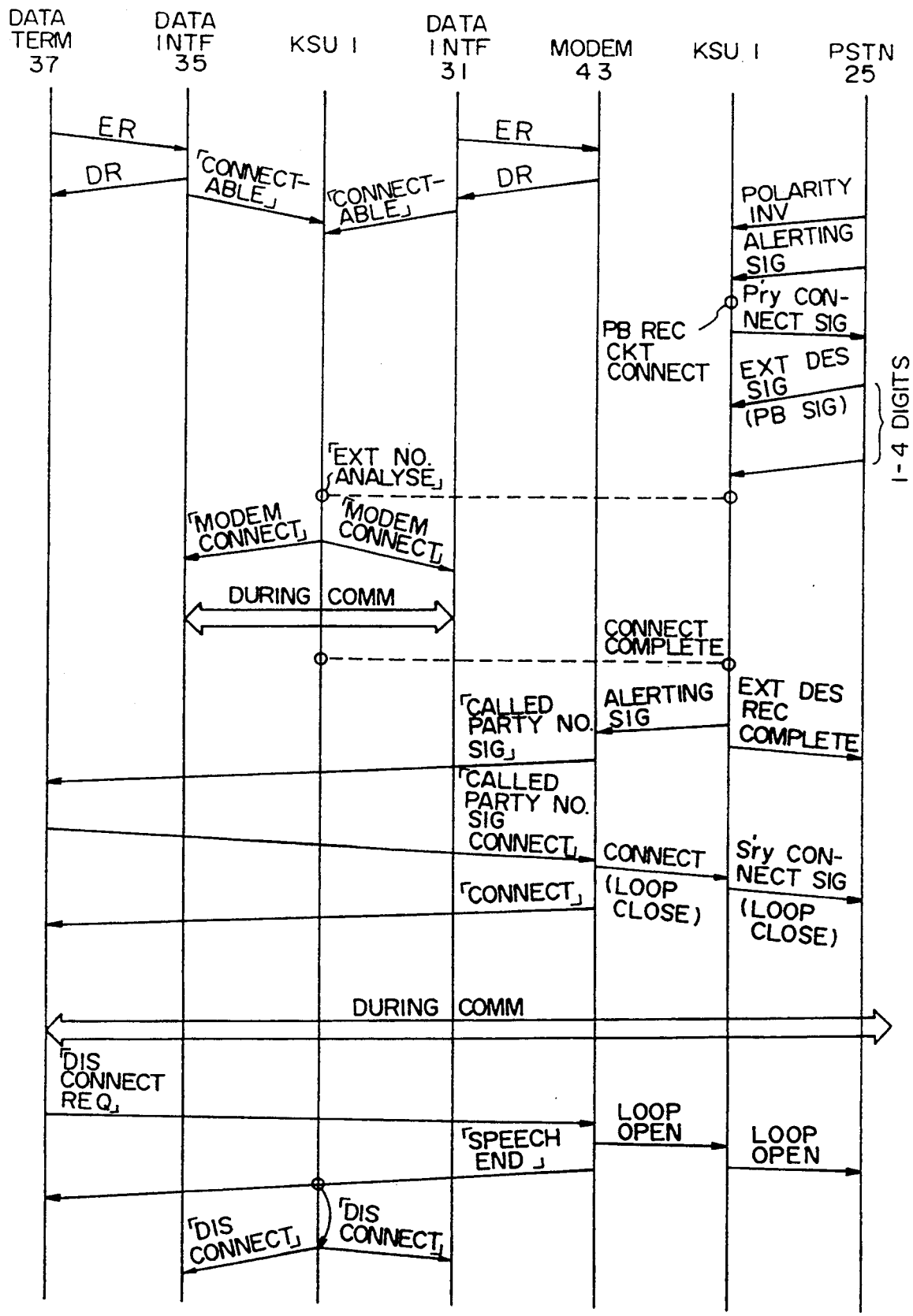

The connection procedure at called party number signal reception in the dial service via the PSTN 25 will be explained hereinbelow with reference to FIG. 19.

In the same way as in the status monitoring operation of the TA 41 already explained, the modem 43 and the data interface unit 31 monitor the ready status each other. In standby status, the data interface unit 31 turns on the terminal ready signal ER. If the modem 43 turns on the data set ready signal DR, the microcomputer 109 in the data interface unit 31 detects this turn-on status and transmits a command [CONNECTABLE] to the control unit 3 in the key service unit. In response to this command, the microcomputer 49 writes [0] in the modem busy table. When the office line interface unit 11 receives the polarity inversion from the PSTN 25 and succeedingly an alerting signal, the microcomputer 249 in the office line interface unit 11 recognizes this as a dial-in called party number signal, and transmits a command [CALLED PARTY NO. SIGNAL RECEIVE] to the control unit 3 in the key service unit via the control data highway 5. In response to this command [CALLED PARTY NO. SIGNAL RECEIVE], the microcomputer 49 in the key service unit instructs the time switch circuit 51 to exchange the time slot allocated to the office line interface unit 11 and the time slot allocated to the MF signal receiver 53, that is, to form a communication channel between the PSTN 25 and the MF signal receiver 53, and additionally controls the computer 249 in the office line interface unit 11 so as to transmit a primary response signal to the PSTN 25. Then, an extension telephone set designating signal of 1 to 4 digits is transmitted from the PSTN 25 in the MF signal form, and inputted to the MF signal receiver 53 via the above-mentioned communication channel.

The MF signal receiver 53 analyzes the received MF signal, and indicates an extension telephone number to be connected to the microcomputer 49. In response to the extension telephone number, the microcomputer 49 checks whether the terminal 37 of this extension telephone number is busy with reference to the table 285 and further the modem busy table 313. If both are in standby status, the microcomputer 49 transmits a command [MODEM CONNECT] to the data interface units 31 and 35, and writes a busy bit [1] to the corresponding column in the tables 385 and 313. In addition, the time switch control section 329 instructs the time switch circuit 51 to exchange the time slot allocated to the extension telephone number and the time slot allocated to the modem 43, that is, to form a data communication channel between the data terminal 37 and the modem 43.

When the microcomputer 59 receives a command [MODEM CONNECT], the data interface unit 35 controls the selectors 65 and 67 to set the communication mode. In the same way, the communication mode is set in the data interface unit 31.

As described above, a data communication channel can be formed between the modem 43 and the data terminal 37 by way of the modem 43, RS-232D interface 47, data interface unit 31, digital telephone set interface unit 17, PCM highway 7, digital telephone set interface unit 13, data interface unit 35, RS-232D interface 39, and the data terminal 37.

Upon completion of the above processing, the microcomputer in the key service unit controls the computer 263 in the standard telephone set interface unit 21 to transmit an alerting signal to the modem 43, and further controls the office line interface unit 11 so as to transmit an extension telephone designate receive complete signal (dc loop is disconnected) to the PSTN 25.

In response to the above alerting signal, the modem 43 transmits a command [COMMAND PARTY NO. SIGNAL RECEIVE] as the receive data RD of the RS-232D from the modem 43 to the data interface unit 31. This command is received by the data terminal 37 via the above-mentioned data communication channel. In response to this command, the data terminal 37 transmits a command [COMMAND PARTY NO. SIGNAL RECEIVE CONNECT] as the transmit data SD of the RS-232D, and waits the arrival of a command [CONNECT].

In response to the command [COMMAND PARTY NO. SIGNAL RECEIVE CONNECT] from the data terminal 37, the modem 43 closes the dc loop, and transmits a command [CONNECT] as the receive data RD.

When having recognized that the dc loop is closed by the modem 43, the microcomputer 47 in the key service unit controls the office line interface unit 11 so as to transmit a secondary response signal (to close the dc loop) to the PSTN 25, and further instructs the time switch circuit 51 to exchange the time slot allocated to the office line interface unit 11 and the time slot allocated to the standard telephone set interface unit 21, that is, to form a communication channel between the PSTN 25 and the modem 43. As described above, the data communications between the PSTN 25 and the data terminal 37 can be started.

Figure 20:
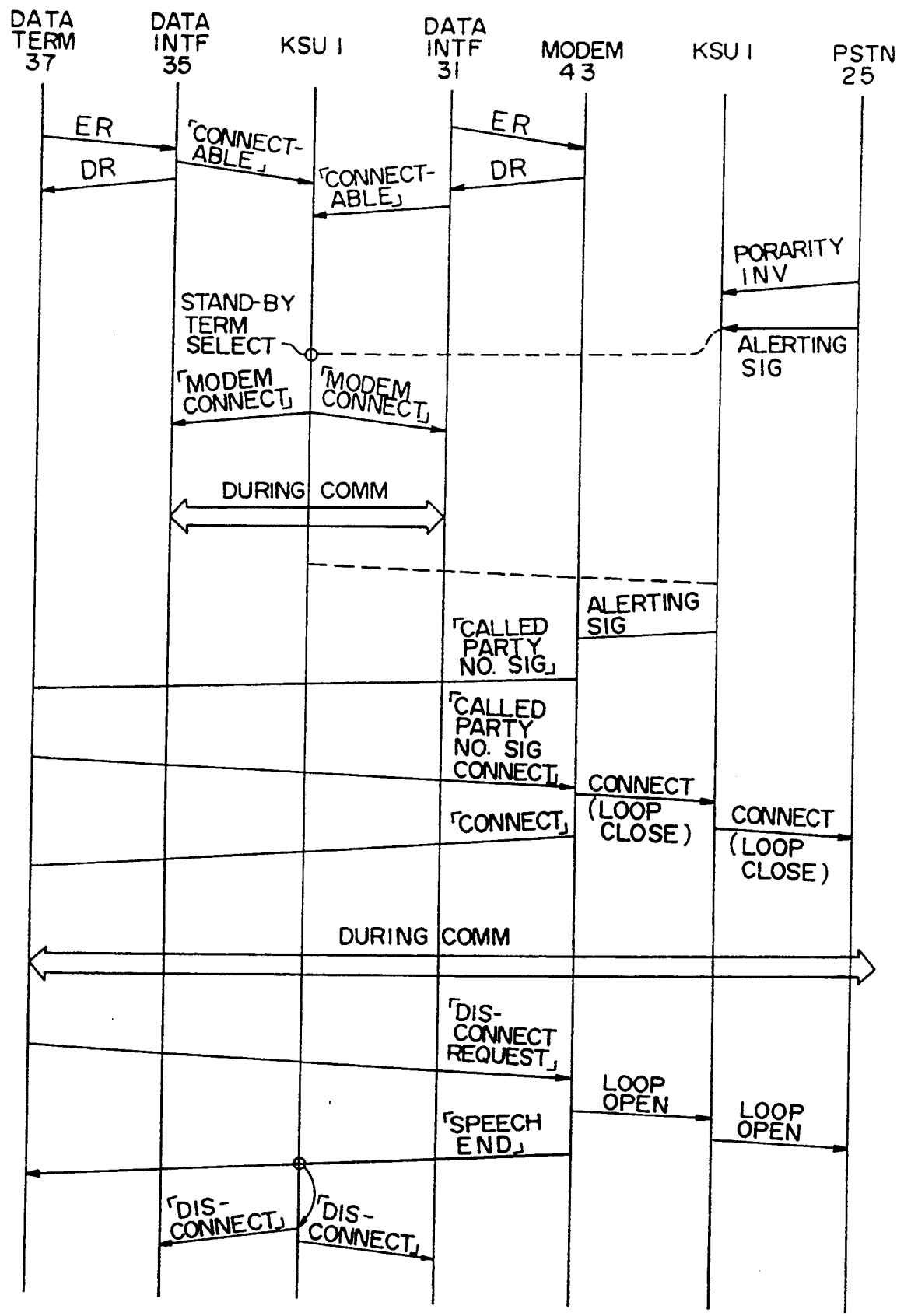

The connection procedure of called party number signal reception in the non-dial service via the PSTN 25 will be explained hereinbelow with reference to FIG. 20.

An alerting signal arrives from the PSTN 25, the microcomputer 249 in the office line interface unit 11 recognizes this signal as a called party number signal, and transmits a command [CALLED PARTY NO. SIGNAL RECEIVE] to the control unit 3 in the key service unit via the control data highway 5. In response to this command, the microcomputer 49 in the control unit 3 checks the columns in the terminal busy table 285 in accordance with the priority order stored in the priority table 345, and checks the modem busy table 313. As a result, where any standing-by data terminal 37 is found and also the modem 43 is in standby status, a command [MODEM CONNECT] is transmitted to the data interface units 35 and 31, and further writes a busy bit [1] to the corresponding columns of both the tables 285 and 313. Further, a communication channel between the data terminal 37 and the modem 43 is formed by the time switch circuit 51. In response to the command [MODEM CONNECT], the data interface units 35 and 31 return to the ordinary mode.

Upon completion of the above processing, the computer 49 of the key service unit controls the standard telephone set interface unit 21 so as to transmit an alerting signal to the modem 43. In response to this alerting signal, the modem 43 transmits a command [CALLED PARTY NO. SIGNAL RECEIVE] as the receive data RD of the RS-232D. This command is received by the data terminal 37 via the above-mentioned data communication channel. In response to this command, the data terminal 37 returns a command [CALLED PARTY NO. SIGNAL RECEIVE CONNECT] as the transmit data SD of the RS-232D, and waits the arrival of a command [CONNECT].

In response to the command [CALLED PARTY NO. SIGNAL RECEIVE CONNECT], the modem 43 responds to the dc loop close, and transmits a command [CONNECT] as the receive data RD.

When having recognized that the dc loop is closed by the modem 43, the microcomputer in the key service unit controls the office line interface unit 11 so as to close the dc loop of the PSTN 25, and further instructs the time switch circuit 51 to form a speech communication channel between the PSTN 25 and the modem 43. As described above, the data communications between the PSTN 25 and the data terminal 37 can be started.

Only one embodiment of the present invention has been described by way of example. Without being limited thereto, however, the present invention can be modified into various ways. For example, the present invention can be applied to a plurality of the pooled TAs or modems. In this case, a single TA or modem in standby status is selected at the called party number signal reception and connected to a data terminal.

We claim:

1. A modem pooling system in which a modem is pooled to enable communications between a telephone line and a plurality of data terminals respectively, comprising:

switching means for opening/closing a first communication channel between the telephone line and the modem and second communication channels between the plurality of data terminals and the modem;

terminal selecting means for selecting a data terminal from the plurality of data terminals in accordance with an extension telephone designation signal given by the telephone line in dial-in service when there is a call incoming from the telephone line;

exchange control means for closing one of the second communication channels between the selected data terminal and the modem by controlling said switching means when there is a call incoming from the telephone line, to establish a status equivalent to that where the selected data terminal is directly coupled to the modem; and call control means for informing the modem of the call incoming from the telephone line to allow the modem to send a call signal to the selected data terminal, after one of the second communication channels between the selected data terminal and the modem has been closed when there is a call incoming from the telephone line.

2. The modem pooling system of claim 1, wherein a central unit is provided between the telephone line and the plurality of data terminals, the modem, and includes said switching means, said terminal selecting means, exchange control means, and said call control means.

3. The modem pooling system of claim 2, wherein said central unit includes a control computer associated with the telephone line, the plurality of data terminals, the modem and said switching means and provided with said terminal selecting means, said exchange control means and said call control means.

4. The modem pooling system of claim 3, wherein said control computer is not concerned in communications between the selected data terminal and the modem, when the selected data terminal and the modem are in the status equivalent to the direct coupling.

5. The modem pooling system of claim 1, wherein said exchange control means closes the first communication channel between the modem and the telephone line, when the selected data terminal responds to the call from the modem.

6. The modem pooling system of claim 1, which further comprises status checking means for checking whether the selected data terminal and the modem are in busy or standby status, respectively when there is a call incoming from the telephone line, and wherein said exchange control means closes a second communication channel between the selected data terminal and the modem only when the selected data terminal and the modem are both in standby status, respectively.

7. The modem pooling system of claim 6, wherein said status checking means comprises:

status table means for recording current status of the plurality of data terminals and the modem, respectively;

rewriting means for rewriting records in said status table means according to changes in current status of the plurality of data terminals and the modem, respectively; and checking means for checking the current status of the selected data terminal and the modem, respectively when there is a call incoming from the telephone line and with reference to said status table means.

8. The modem pooling system of claim 1, wherein said terminal selecting means comprises:

signal returning means for returning a temporary response signal to the telephone line in response to a called party number signal from the telephone line; and indicating means for receiving an extension telephone designation signal transmitted from the telephone line in response to the temporary response signal, recognizing an extension telephone number designated by the extension telephone designation signal, and indicating the recognized extension telephone number to said exchange control means as an extension telephone number of the selected data terminal.

9. A central unit for a modem pooling system in which a modem is pooled to enable communications between a telephone line and a plurality of data terminals, respectively via the central unit connected to the telephone line, comprising:

switching means for opening/closing a first communication channel between the telephone line and the modem and second communication channels between the plurality of data terminals and the modem;

terminal selecting means for selecting a data terminal from the plurality of data terminals in accordance with an extension telephone designation signal given by the telephone line in dial-in service when there is a call incoming from the telephone line;

exchange control means for closing one of the second communication channels between the selected data terminal and the modem by controlling said switching means when there is a call incoming from the telephone line, to establish a status equivalent to that where the selected data terminal is directly coupled to the modem; and call control means for informing the modem of the call incoming from the telephone line to allow the modem to send a call signal to the selected data terminal, after one of the second communication channels between the selected data terminal and the modem has been closed when there is a call incoming from a telephone line.

10. The central unit of claim 9, wherein said central unit includes a control computer associated with the telephone line, the data terminals, the modem and said switching means and provided with said terminal selecting means, said exchange control means and said call control means.

11. The central unit of claim 10, wherein said control computer is not concerned in communications between the selected data terminal and the modem, when the selected data terminal and the modem are in the status equivalent to the direct coupling.

12. The central unit of claim 9, wherein said exchange control means closes the first communication channel between the modem and the telephone line, when the selected data terminal responds to the call signal from the modem.

13. The central unit of claim 9, which further comprises status checking means for checking whether the selected data terminal and the modem are in busy or standby status, respectively when there is a call incoming from the telephone line, and wherein said exchange control means closes a second communication channel between the selected data terminal and the modem only when the selected data terminal and the modem are both in standby status, respectively.

14. The central unit of claim 13, wherein said status checking means comprises:
- status table means for recording current status of the plurality of data terminals and the modem, respectively;
- rewriting means for rewriting records in said status table means according to changes in current status of the plurality of data terminals and the modem, respectively; and
- checking means for checking the current status of the selected data terminal and the modem, respectively when there is a call incoming from the telephone line and with reference to said status table means.

15. The central unit of claim 9, wherein said terminal selecting means comprises:
- signal returning means for returning a temporary response signal to the telephone line in response to a called party number signal from the telephone line; and
- indicating means for receiving an extension telephone designation signal transmitted from the telephone line in response to the temporary response signal, recognizing an extension telephone number designated by the extension telephone designation signal, and indicating the recognized extension telephone number to said exchange control means as an extension telephone number of the selected data terminal.

16. A method of establishing communication links between a telephone line and a plurality of data terminals, respectively via a modem, in a modem pooling system in which the modem is pooled to enable the respective communications between the telephone line and the plurality of data terminals, the method comprising the steps of:
- selecting a data terminal from the plurality of data terminals in accordance with an extension telephone designation signal given by the telephone line in dial-in service when there is a call incoming from the telephone line;
- closing a communication channel between the selected data terminal and the modem when there is a call incoming from the telephone line, to establish a status equivalent to that where the selected data terminal is directly coupled to the modem; and
- informing the modem of the call incoming from the telephone line to allow the modem to send a call signal to the selected data terminal, after one of the second communication channels between the selected data terminal and the modem has been closed when there is a call incoming from the telephone line.

17. The method of claim 16, which further comprising the step of closing the first communication channel between the modem and the telephone line, when the selected data terminal responds to the call signal from the modem.

18. The method of claim 16, which further comprises the steps of checking whether the selected data terminal and the modem are in busy or standby status, respectively when there is a call incoming from the telephone line, and closing a second communication channel between the selected data terminal and the modem only when the selected data terminal and the modem are both in standby status, respectively.

19. The method of claim 16, wherein the terminal selecting step comprises the steps of:
- returning a temporary response signal to the telephone line in response to a called party number signal from the telephone line;
- receiving an extension telephone line designation signal transmitted from the telephone line in response to the temporary response signal; and
- selecting a data terminal having the extension telephone number designated by the extension telephone designation signal.

* * * * *